(12) United States Patent
Katz

(10) Patent No.: US 10,339,306 B1
(45) Date of Patent: Jul. 2, 2019

(54) METHODS AND SYSTEMS FOR FRAUD CONTAINMENT

(71) Applicant: The 41st Parameter, Inc., Scottsdale, AZ (US)

(72) Inventor: Elazar Katz, Boynton Beach, FL (US)

(73) Assignee: The 41st Parameter, Inc., Scottsdale, AZ (US)

( * ) Notice: Subject to any disclaimer, the term of this patent is extended or adjusted under 35 U.S.C. 154(b) by 43 days.

(21) Appl. No.: 15/471,990

(22) Filed: Mar. 28, 2017

Related U.S. Application Data

(63) Continuation of application No. 13/782,745, filed on Mar. 1, 2013, now Pat. No. 9,633,201.

(60) Provisional application No. 61/605,677, filed on Mar. 1, 2012.

(51) Int. Cl.
*G06F 21/55* (2013.01)
*G06Q 30/00* (2012.01)

(52) U.S. Cl.
CPC ............ *G06F 21/55* (2013.01); *G06Q 30/00* (2013.01)

(58) Field of Classification Search
USPC ........................................................ 726/22
See application file for complete search history.

(56) References Cited

U.S. PATENT DOCUMENTS

| 7,359,962 | B2* | 4/2008 | Willebeek-LeMair | ........................ H04L 29/06 709/223 |
| 7,735,141 | B1* | 6/2010 | Noel | ................... H04L 63/1425 709/223 |
| 7,945,494 | B2* | 5/2011 | Williams | ............... G06Q 20/10 705/35 |
| 8,209,760 | B1* | 6/2012 | Hardman | .............. G06F 21/577 726/25 |
| 8,307,430 | B1* | 11/2012 | Chen | .................... H04L 63/1458 726/22 |
| 8,407,798 | B1* | 3/2013 | Lotem | ..................... G06F 21/55 726/18 |
| 8,881,288 | B1* | 11/2014 | Levy | ..................... G06F 21/577 709/225 |
| 9,633,201 | B1* | 4/2017 | Katz | ...................... G06F 21/55 |
| 9,781,151 | B1* | 10/2017 | McCorkendale | ... H04L 63/1441 |
| 2004/0098618 | A1* | 5/2004 | Kim | .................... H04L 63/1458 726/23 |
| 2005/0210533 | A1* | 9/2005 | Copeland | ............ H04L 63/1416 726/23 |

(Continued)

OTHER PUBLICATIONS

U.S. Appl. No. 13/782,745, U.S. Pat. No. 9,633,201, Methods and Systems for Fraud Containment, filed Mar. 1, 2013.

*Primary Examiner* — David J Pearson
*Assistant Examiner* — Badridot Champakesanatusptodotgov
(74) *Attorney, Agent, or Firm* — Knobbe, Martens, Olson & Bear, LLP

(57) ABSTRACT

Systems and methods for fraud containment are provided in accordance with an embodiment of the invention. A fraud event may be detected. One or more devices that may be used in perpetrating the fraud event may be detected. Additionally one or more potential fraud victims, who may be grouped into victim circles may be detected. The threat level to the victims and/or victim circles may be assessed. In some instances, behavioral profiles may be utilized to make fraud assessments. Based on the threat level, recommendations for fraud containment responses may be provided.

17 Claims, 8 Drawing Sheets

(56) References Cited

U.S. PATENT DOCUMENTS

| | | | |
|---|---|---|---|
| 2006/0031938 A1* | 2/2006 | Choi | G06F 21/552 726/25 |
| 2006/0075492 A1* | 4/2006 | Golan | G06F 21/55 726/22 |
| 2008/0002725 A1* | 1/2008 | Alicherry | H04L 45/04 370/401 |
| 2009/0138590 A1* | 5/2009 | Lee | H04L 43/045 709/224 |
| 2009/0280777 A1* | 11/2009 | Doherty | H04M 1/66 455/411 |
| 2009/0293128 A1* | 11/2009 | Lippmann | H04L 63/1433 726/25 |
| 2009/0307119 A1* | 12/2009 | Ahles | G06Q 20/042 705/35 |
| 2010/0169192 A1* | 7/2010 | Zoldi | G06Q 40/00 705/30 |
| 2012/0084860 A1* | 4/2012 | Cao | H04L 63/1441 726/23 |
| 2012/0216282 A1* | 8/2012 | Pappu | H04L 63/1416 726/23 |
| 2014/0122343 A1* | 5/2014 | Einav | G06Q 20/4016 705/67 |

\* cited by examiner

METHODS AND SYSTEMS FOR FRAUD CONTAINMENT

This patent application is a continuation of U.S. patent application Ser. No. 13/782,745, filed Mar. 1, 2013, entitled METHODS AND SYSTEMS FOR FRAUD CONTAINMENT, which claims benefit of priority to U.S. Provisional Application Ser. No. 61/605,677, filed on Mar. 1, 2012, entitled METHODS AND SYSTEMS FOR FRAUD CONTAINMENT, which is incorporated herein by reference in its entirety.

BACKGROUND

Many methods and systems have been developed over the years to prevent or detect Internet fraud. Today, to gain consumer confidence and prevent revenue loss, online communities, such as financial institutions, a website operator, merchant, or other online communities that desire ring enrollment may desire an accurate and trustworthy way of detecting possible Internet fraud and providing Internet security. Many sites require entry of a password or other credentials for authentication, but this does not suffice because credentials may be stolen.

Traditionally, entities have used manual processes to review a suspected fraudulent transaction and individuals who may have been involved, which is often cumbersome and time consuming. Conventional fraud detection systems often focus on a user's account and behavior of the user to find anomalous behavior. However, if too much time has passed between a fraudulent transaction and/or early-stage fraud staging activities (e.g., including the theft of credentials, changing the victim's contact information to disrupt communication between the bank and the victim, adding payees for future money movement), and/or identifying fraudsters, fraudulent attacks may have occurred undetected in the mean-time.

Accordingly, a need exists for improved methods and systems for fraud containment. A further need exists for mandating the integrity of online communities and services.

SUMMARY

An aspect of the invention may be directed to an enterprise security and fraud detection and prevention system. Systems and methods may be provided for detecting physical devices that interact with a group of potential victims over an electronic network in support of fraudulent activities. A fraud containment system may include (i) systems and methods for identifying circles of at-risk customers targeted by a common physical device; (ii) systems and methods for profiling the interaction between the device and individual victims and between the device and the circle of victims as a whole; (iii) systems and methods for identifying accomplice devices that acted in support of confirmed fraud even when the fraud transaction did not occur over an electronic network or the device was not directly involved in the fraudulent transaction; (iv) systems and methods for identifying devices that may have assisted in the compromise of an account whose credentials have been stolen; (v) systems and methods for using at-risk victim circles to assist in prioritizing and directing rapid-response and attack-containment activities; (vi) systems and methods for assessing the threat/vulnerability of individual victim circles and the network as a whole; and/or (vii) systems and methods for expanding the scope of monitoring coverage to cover the combined networks of multiple organizations.

An aspect of the invention is directed to a method for fraud containment comprising: determining a proximity of a device to a fraud event; based on said proximity, determining that the device is high risk for fraud involvement; identifying one or more user accounts associated with the device; and identifying one or more potential victim accounts from the one or more user accounts associated with the device.

Another aspect of the invention is directed to a method for fraud containment. The method may comprise: identifying one or more fraud perpetrator devices; determining a behavioral profile of the fraud perpetrator device based on interactions between the fraud perpetrator device and one or more known victim accounts; and comparing the behavioral profile with the fraud perpetrator device with interactions between the fraud perpetrator devices and other accounts, thereby identifying additional potential victim accounts.

A method and system for fraud containment may be provided in accordance with an additional aspect of the invention. These implementations may comprise steps and modules for: determining a proximity of a virtual representation of an individual to a fraud event; based on said proximity, determining that the virtual representation is high risk for fraud involvement; identifying one or more user accounts associated with the virtual representation; and identifying one or more potential victim accounts from the one or more user accounts associated with the virtual representation. A virtual representation, which may be also referred to as digital identities anywhere else herein, corresponds to an individual and may take into consideration any devices, accounts and/or other characteristics described elsewhere herein which are associated with the individual. The invention provides methods and systems for the assessment and determination of a level of risk or trust (or confidence) for such virtual representations in the same ways described herein for one or more devices, individuals or accounts.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

Figure 6:
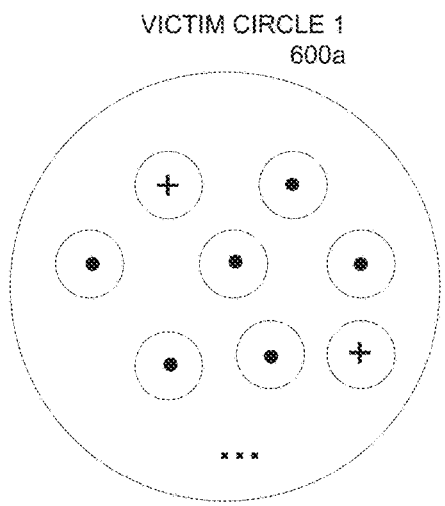
Figure 6:
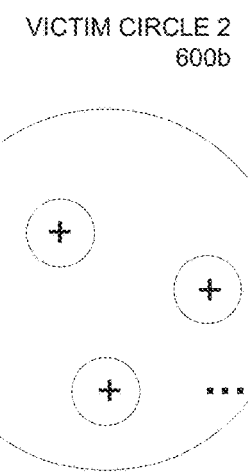
Figure 6:
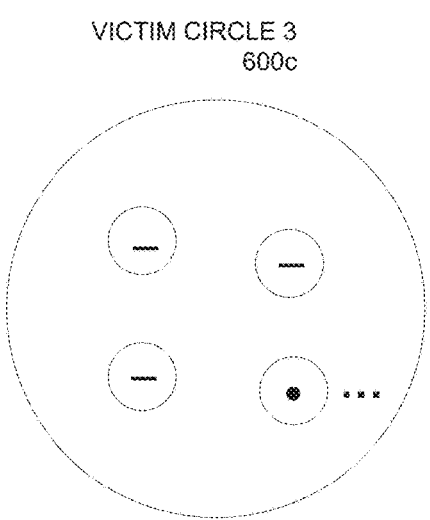

FIG. 6 provides an illustration of victim circles in accordance with an embodiment of the invention.

Figure 7:
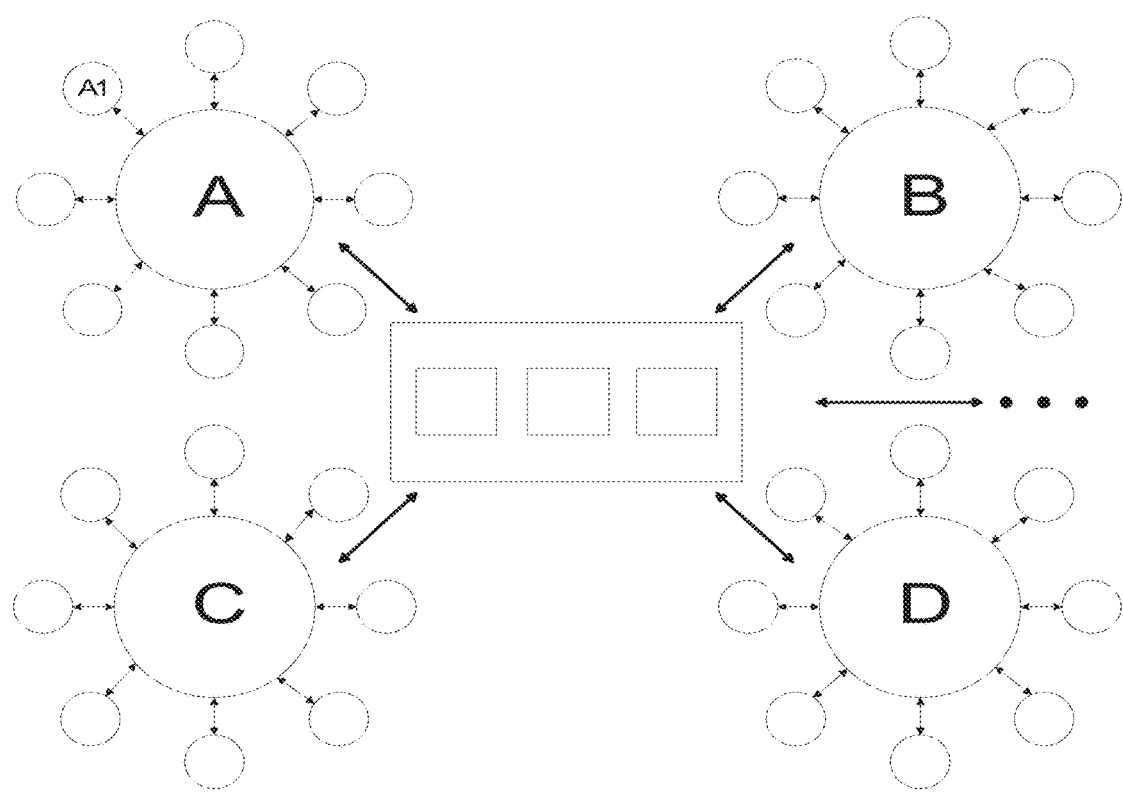

FIG. 7 shows an example of a consortium for sharing fraud-related data in accordance with an embodiment of the invention. Sharing may include the shared-monitoring of behavior, such as counting the number of accounts accessed by the same device across multiple banks. Although in some instances the fraudster may not have accessed enough accounts in any single bank, shared insight may result from the ability to detect the behavior across banks in aggregate.

Figure 8:
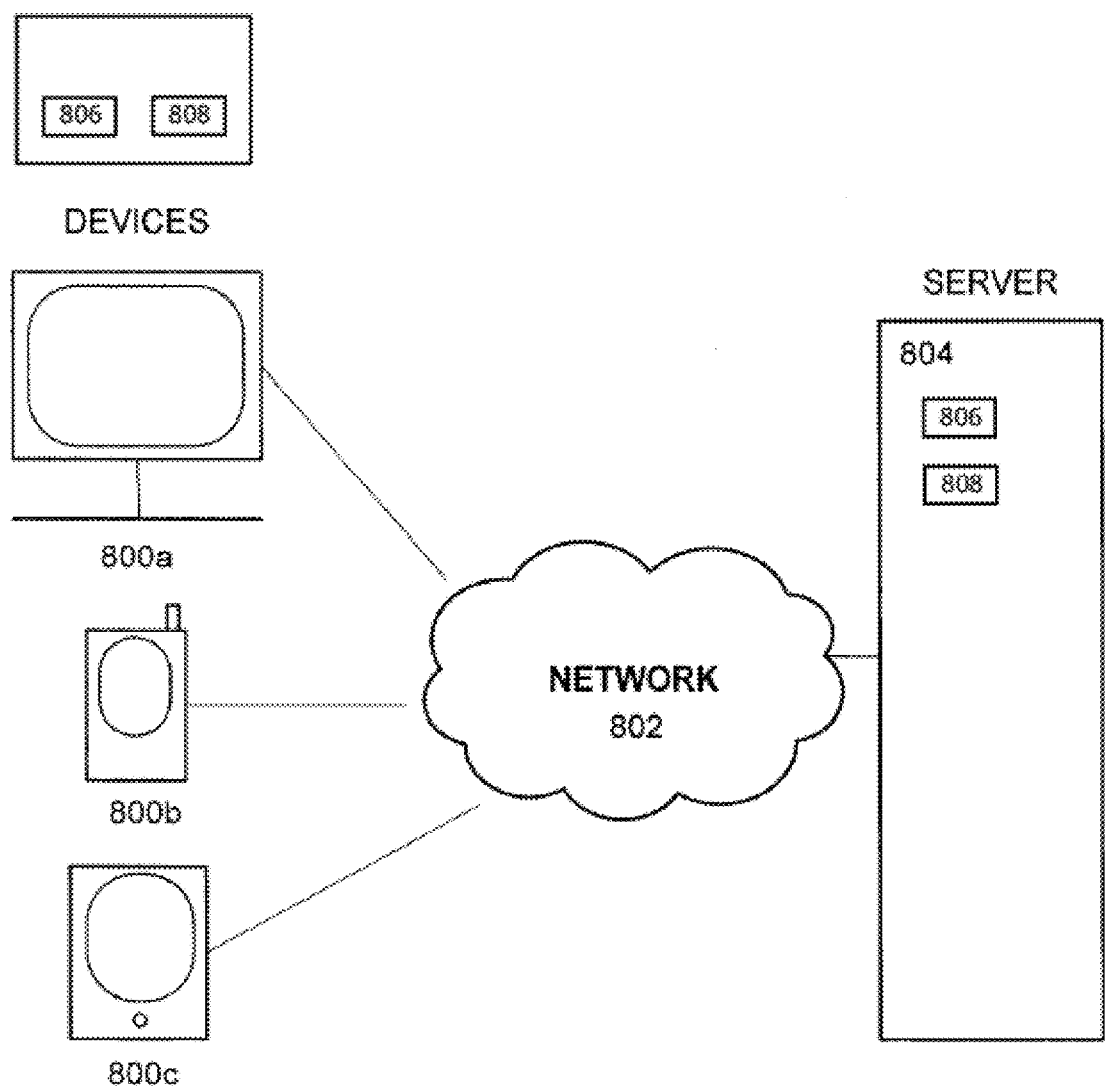

FIG. 8 describes a computer network having a fraud containment system that can communicate with a plurality of devices.

DETAILED DESCRIPTION

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for fraud containment. Systems and methods described herein may maintain the integrity and security of online communities. Various aspects of the invention described herein may be applied to any of the particular applications set forth below or for any other types of data handling or fraud detection system. The invention may be applied as a standalone system or method, or as part of an integrated electronic transaction system. It shall be understood that different aspects of the invention can be appreciated individually, collectively, or in combination with each other.

Systems and methods for detecting physical devices that interact with a group of potential victims over an electronic network in support of fraudulent activities may be provided in accordance with an aspect of the invention. Such systems and methods may perform one or more of the following: (i) identify circles of at-risk customers targeted by a common physical device; (ii) profile the behavioral interaction between the device and individual victims and between the device and the circle of victims as a whole; (iii) identify devices that acted as an accomplice in support of confirmed fraud even when the fraud transaction did not occur over an electronic network or the device was not directly involved in the fraudulent transaction; (iv) identify devices that may have participated in the compromise of an account whose credentials have been determined to have been stolen; (v) use at-risk victim circles to assist in prioritizing and directing rapid-response and attack-containment activities; (vi) use the size and risk of at-risk victim circles to assess and quantify the threat/vulnerability level of the network as a whole; and (vii) expand the scope of monitoring coverage to cover the combined networks of multiple organizations.

One or more of the steps described herein may occur automatically without requiring human intervention. Systems may include a processor that may execute a program capable of performing one or more of the steps. In some instances, one or more of the steps may be performed manually and/or may involve human interaction.

Figure 1:
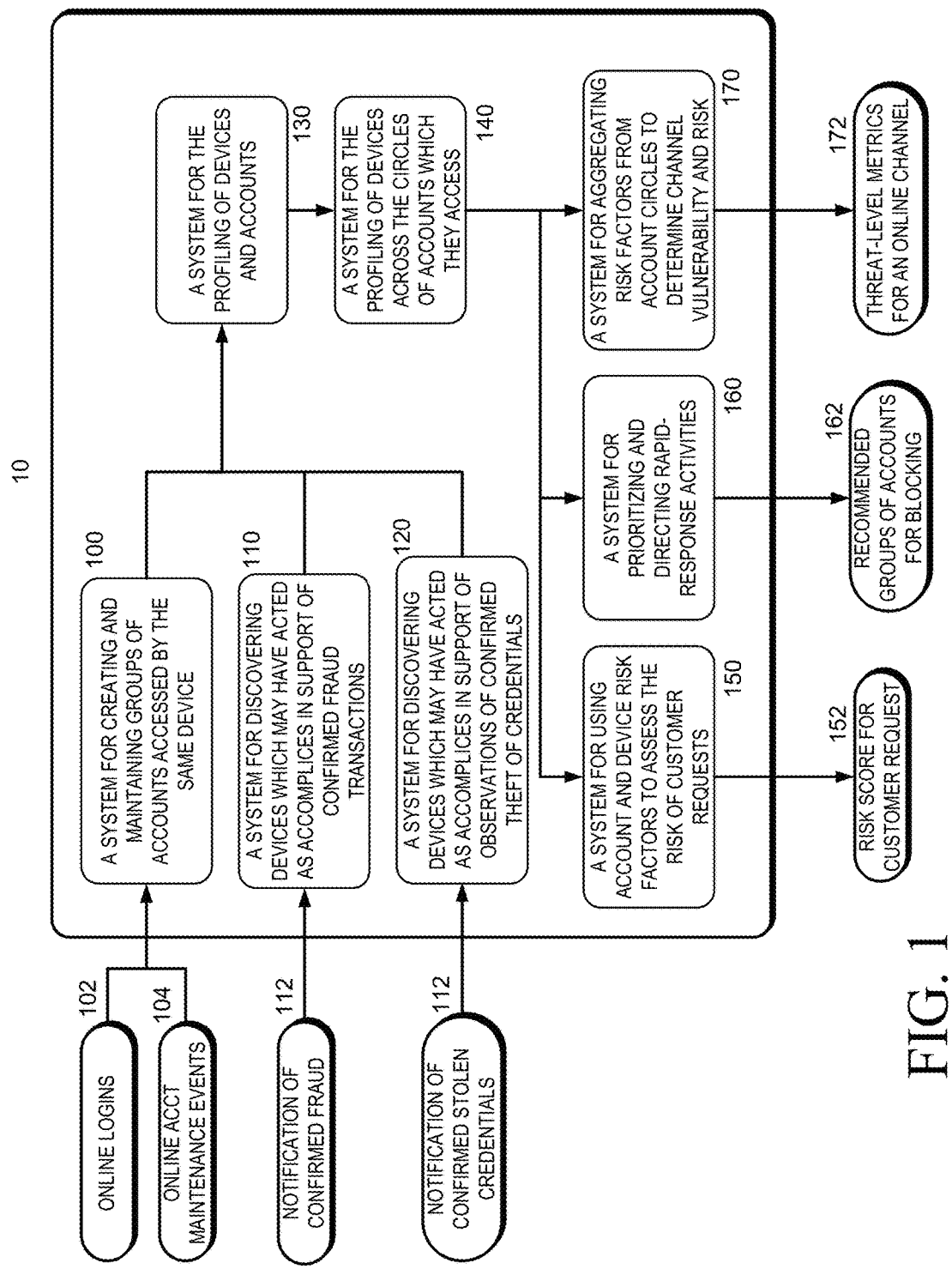
FIG. 1 shows a system for fraud containment provided in accordance with an embodiment of the invention.

FIG. 1 shows a system for fraud containment provided in accordance with an embodiment of the invention. Systems for fraud containment may be capable of detecting fraud and/or identifying parties associated with the fraud. Systems for fraud containment may be capable of assessing threat levels to victims or victim groups and may be capable of providing recommended fraud containment responses. Systems for fraud containment may be useful for maintaining the integrity and security of online communities. Any description of fraud containment may apply to such maintenance of online communities and vice versa.

The system 10 for fraud containment may include one or more subsystems that may perform one or more steps for fraud containment. The system may be capable of performing one or more computer-implemented methods or steps. The system may be provided on and/or implemented by one or more devices. A device may be a computer, such as a personal computer, client-side computer, server computer, laptop computer, tablet, mobile device (e.g., smartphone, cellular phone, personal digital assistant). A device (such as those used for fraud containment) may include a processor and a memory. The memory may include storage for data, which may include non-transitory computer readable media such as code, logic, or instructions for performing one or more step. Algorithms may be stored in memory. The processor may be capable of carrying out one or more steps described herein.

In some embodiments, a device may be a virtual representation of an individual or entity. In some instances, the individual or identity may be a fraudster. A device may provide a virtual representation of a fraudster. A device may be a proxy or representation of an individual or entity. Any descriptions herein may apply to other proxies of individuals, and vice versa. For example, an email address may be used in person-to-person payments, which may be used as representations of individuals involved. Any identifier, such as email addresses, names, credit cards, phone numbers, addresses, usernames, passwords may be used as a proxy. One or more proxies may be identified and/or associated with a fraudulent transaction or potential fraud.

In some embodiments, the system 10 may be implemented using a single device. Alternatively, the system may be distributed over a plurality of devices. The subsystems may be implemented together on a single device, or may be distributed over a plurality of devices. In some instances, each subsystem may be implemented on its own device. Alternatively, some subsystems may share devices. One or more programs may be provided in memory that may assist with carrying out the functions of the one or more subsystems.

A group tracking system 100 may be a subsystem of the fraud containment system 10. The group tracking system may create and maintain groups of accounts (and/or records of such accounts) accessed by the same device. The group tracking system may store and/or track account information. The account information may be grouped by devices that have accessed the accounts. In some instances, device information may be stored. Account information for accounts that have been accessed by the device may be associated with the device. Such accounts may be grouped together.

Information about account and/or device activity may be stored in the group tracking system 100. Such information may include online logins 102 and online account maintenance events 104. Online logins may include times that a user logged in, characteristics of a device the user used to log in, identifying information that a user used to login, or characteristics associated with the login or authentication procedure (e.g., number of times a password was entered/login attempts made, timing of password, etc.). Online account maintenance events may include activities performed by a user in the account, how the user used the account, settings of the account, any activity associated with the account, checks performed on the account. Such user login and account information may be stored through the group tracking system, along with device information.

Device information may include one or more characteristics of the device, such as network address (e.g., IP address), browser ID, device clock information, or settings associated with the device. Device information may be associated with related account information. In some instances, a device may be associated with a single account of a plurality of accounts. In some instances, an account may have been accessed by a single device or a plurality of devices. A plurality of accounts may have been accessed by a single device or a plurality of devices. Such information may be stored in a memory of the system.

A confirmed fraudulent transaction system 110 may be another subsystem of the fraud containment system 10. The confirmed fraudulent transaction system may discover devices which may have acted as accomplices in support of confirmed fraudulent transactions. In some instances, a fraudulent transaction may be detected and/or confirmed. One or more account involved in the fraudulent transaction may be identified. Devices associated with the transaction and/or the account may be identified. Such associated devices may be assessed to determine likelihood of involvement with the fraud. A risk assessment may determine the likelihood that one or more of the associated devices acted as accomplices in support of the fraudulent transaction.

Information about transaction and/or device activity may be stored in the confirmed fraudulent transaction system 110. Such information may include notification of confirmed fraud 112. The notification of the confirmed fraud may include information about the fraudulent transaction. Information such as time of the fraudulent transaction, accounts involved with the fraudulent transaction, devices associated with the accounts, devices active at or around the time of the fraudulent transaction, or behavioral profiles associated with the fraudulent transaction may be included. Such information may be stored in a memory of the system. In other embodiments of the invention, such information may include notification of untrusted or risky devices. It may be beneficial to store in the same system, or in a separate at-risk or "possible" fraudulent transaction system, similar types of information related to transactions, accounts etc. involving untrusted devices that are assessed with a level of risk above a predetermined threshold or below a selected confidence level.

Additionally, a confirmed credential theft system 120 may be a subsystem of the fraud containment system 10. The confirmed credential theft system may discover devices which may have acted as accomplices in support of observations of confirmed credential theft system. In some instances, a theft of credentials may be detected and/or confirmed. One or more account involved in the credentials theft may be identified. Devices associated with the theft and/or the account may be identified. Such associated devices may be assessed to determine likelihood of involvement with the theft. A risk assessment may determine the likelihood that one or more of the associated devices acted as accomplices in support of the credential theft.

Information about theft and/or device activity may be stored in the confirmed credential theft system 120. Such information may include notification of confirmed stolen credentials 122. The notification of the confirmed stolen transaction may include information about the credentials that were stolen. Information such as accounts associated with the credentials, accounts active at the time credentials were stolen or used, devices associated with the accounts, devices active at or around the time credentials were stolen or used, or behavioral profiles associated with the theft may be included. Such information may be stored in a memory of the system.

A profiling system 130 may be provided as a subsystem of the fraud containment system 10. The profiling system may profile devices and accounts. The profiling system may receive information from one or more of the group tracking system 100, confirmed fraudulent transaction system 110, or the confirmed credential theft system 120. Such information may be aggregated and/or combined in order to analyze behavior related to the devices and/or accounts. Such information may also be used to analyze behavior related to suspected or confirmed fraudulent transactions and/or thefts of credentials. Such analysis may assist with the determination of the likelihood that a device was associated with a particular fraudulent transaction and/or theft of credentials.

A circles system 140 may be an additional subsystem of the fraud containment system 10, which may be useful for the profiling of devices across circles of accounts which they access. The circles system may receive information from the profiling system 130. The circles system may analyze which accounts they have accessed. The accounts may be grouped into circles. In some instances, circles of accounts may share one or more common characteristic. Examples of such characteristics may include but are not limited to demographics of account users (e.g., age, location, socioeconomic status, race, gender, credit card company), habits of the users, uses of the accounts, types of account, entities associated with the account (e.g., financial institutions, commerce sites), frequency of account use, other accounts or sites accessed by users of such accounts, or any other common characteristics of account users or accounts.

Thus, devices may be profiled, not only in relation to single accounts, but in relation to circles or groups of accounts. Some devices may be found to act in a particular manner with respect to certain circles of accounts. For example, some devices may be found to have a particular behavior for bank accounts of wealthy individuals at a particular location, which may be notes and used in the assessment of risk.

Information from the circles system 140 may be used in one or more of the following systems: request risk assessment system 150, response prioritization system 160, or risk aggregation system 170. Such systems may be subsystems of a fraud containment system 10.

A request risk assessment system 150 may use account and/or device risk factors to assess the risk of customer requests. For example, in previous subsystems, risks of fraud (e.g., transaction, stolen credentials), may be provided for an account and/or device. The likelihood of fraud may go up or down depending on the combination of a device with a particular account or particular type of account, or vice versa. The risk associated with a particular request may be assessed. For the particular request, the device involved in the request or associated with an account making the request and/or information about the account associated with the request, or a device involved in making the request may be considered in assessing risk.

Any number of degrees of separation between an account and/or device involved in the particular request and additional accounts and/or devices that may have been involved or not involved in fraud may be considered. For example, zero degrees of separation (e.g., only looking at the particular account and/or device involved in the request), a single degree of separation (e.g., looking at other accounts or devices directly associated with accounts and/or devices involved in the request), two degrees of separation (e.g., looking at accounts or devices directly associated with other accounts or devices directly associated with accounts and/or devices involved in the request), three degrees of separation, four degrees of separation, or more may be considered.

Behaviors associated with the account and/or device in making the request, and/or in combination with any degrees of separation may be considered. For example, particular behaviors may raise a red flag and elevate the risk of fraud.

A risk score 152 may be generated for a customer request. In some instances, the risk score may have a numerical value. For example, the risk score may be a number between two other numbers along a scale, such as a number between 1 and 100 or between 1 and 10, or between any other numbers. The risk score may have a qualitative value. The risk score may or may not have a label associated with the risk (e.g., high, medium, low risk). One or more visual indicator may be associated with a risk score (e.g., the number, label, a color (e.g., red high risk, green low risk), size, graphs, charts, lines, percents). The risk score for a request may be calculated based on the devices, accounts, and/or behaviors associated with the particular request. Indicators of fraud associated with the devices, accounts, and/or behaviors associated with the request may raise the risk score. For example, if the device involved in making the request was involved in or suspected of being involved in fraud, the risk score may be raised higher. If the behavior in the particular request mirrors behavior involved in a known fraud transaction, the risk score may be even higher.

A response prioritization system 160 may be used for prioritizing and directing rapid response activities. In some instances, the response prioritization may or may not depend on a risk score 152 for a particular request. In some instances, a response prioritization may consider the likelihood of fraud, and/or the number of potential victims associated with the fraud. For example, a higher likelihood of fraud may increase the priority for a response. A larger number of potential victims associated may also increase the priority for a response. A larger likelihood magnitude of fraud effects (e.g., large amounts of money involved in the fraud) may further increase priority for a response. Such factors, such as likelihood of fraud, number of potential victims of fraud, magnitude of fraud results may be weighted in order to determine the priority of a response.

A recommendation for groups of accounts for blocking 162 may be made based on information from the response prioritization system. For example, a response prioritization system may prioritize actions that may be taken and accounts or groups of accounts on which the actions are to be taken. The highest priority actions may be recommended to be taken first. For example, if taking action on a particular individual account or a group of accounts will alleviate a high likelihood of fraud, large number of victims, and/or large magnitude of fraud results, action may first be taken on that group of accounts over another group of accounts which may have lower risk, smaller number of victims, and/or lesser magnitude of fraud effects.

A group of accounts in such a situation may be an account circle. An account circle may be associated with potential victim accounts. For example, if a high threat is detected for a particular victim circle, extra safeguards may be put into play for the victim circle, or the victim circle accounts may be frozen until further assessment and/or actions can be taken. Moreover, blocking of corresponding devices or untrusted devices to such account(s) can be implemented as described elsewhere herein. An account circle may be associated with potential fraud perpetrator accounts. For example, if a perpetrator circle is determined to present a high threat, such accounts may be frozen to prevent the perpetrator accounts from being used in further fraudulent actions.

For example, a bank or financial institution may be under attack and instruct the response prioritization system 160 for prioritizing and directing rapid response activities. A recommendation for groups of bank accounts for blocking 162 may be made based on information from the response prioritization system. A limited or targeted block of selected accounts within an accounts (victim) circle may be implemented while simultaneously allowing transactions associated with all other accounts to continue uninterrupted. This type of surgical blocking against a subgroup of accounts deemed a threat may avoid having to place a total hold on all accounts thereby allowing banking to continue as usual for other accounts that may represent a vast majority of its customers. By establishing a targeted or surgical block, the bank would not be required to shut its door completely or decline access to all accounts. For some implementations, the bank could designate a third party to issue instructions for such surgical locks on behalf of the bank.

A risk aggregation system 170 may be useful for aggregating risk factors from account circles to determine channel vulnerability and risk. Risk factors, such as those previously described, may be used to determine risk for a particular channel. The particular channel may be at risk as a victim channel, or may be a fraud perpetrator channel.

Threat-level metrics for an online channel 172 may be provided based on information from the risk aggregation system. Threat-level metrics may include a value or a series of values that may determine risk associated with an online channel.

A fraud containment system 10 may be capable of receiving information about user accounts (e.g., logins, maintenance events), devices, and/or confirmed fraud (e.g., fraudulent transactions and/or stolen credentials). The fraud containment system may analyze and/or aggregate the data and may provide information relating to a risk score for a particular customer request, recommended groups of accounts for blocking, and/or threat-level metrics for an online channel. It shall be understood that the aforementioned generation and analysis of risk score values and scales can be equally applicable to and interchangeable with other aspects of the invention herein in calculating and assessing degrees of separation, risk and proximity.

Figure 2:
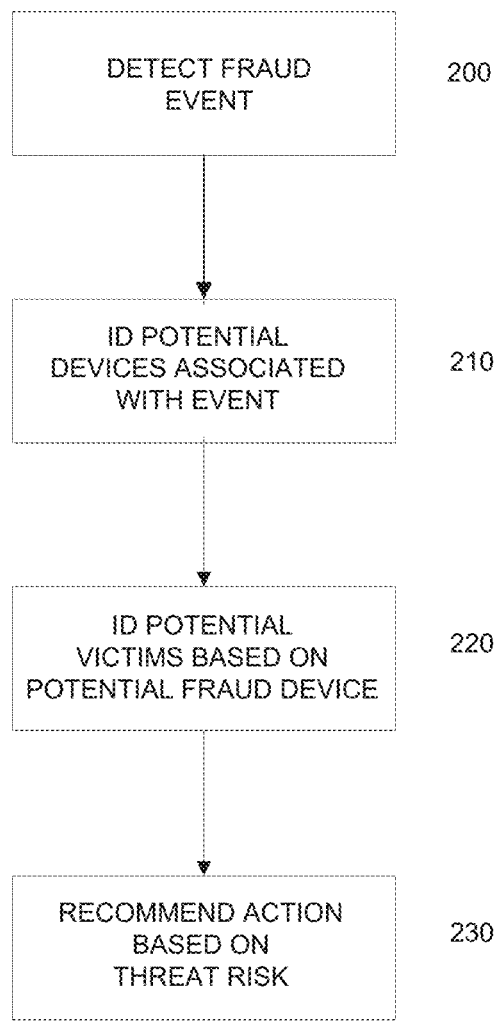
FIG. 2 shows an example of a method for fraud containment.

FIG. 2 shows an example of a method for fraud containment. The method may include detecting a fraud event 200, identifying potential devices associated with the fraud event 210, identifying potential victims 220, and providing recommendations based on threat risks 230.

A fraud event may be detected 200. In some embodiments, a suspicion of a fraud event may be formulated. The fraudulent event may be confirmed. In some instances, the fraudulent event may be confirmed with a threshold certainty. In some instances, a fraudulent event may be confirmed when there is 100% certainty of fraud. Alternatively, a fraudulent event may be confirmed for any other threshold value, such as about 99% or higher, 95% or higher, 90% or higher, 85% or higher, 80% or higher, 75% or higher, or 70% or higher. In some instances, detecting a fraud event may include suspecting fraud with a certain degree of certainty.

A fraud event may be detected when one or more conditions are fulfilled. A fraud may be detected when one or more indicators of fraud are met. For example, if a sudden burst of financial activity occurs in a user's account in a geographic location far from the user to purchase many of the same items, fraud may be suspected. A user or other entity may confirm that a fraud event has occurred. For example, a user may confirm that the user's account was used to purchase an item that the user did not order.

Examples of fraud events may include a fraudulent transaction, or stolen credentials. Fraud may be based on information obtained through "scams" or deceptive practices developed to gain personal, confidential and/or financial information.

For example, a common technique today known as "phishing" involves gaining personal information from an individual to commit identify theft by typically using fraudulent e-mail messages that appear to come from legitimate businesses. "Phishing" can be defined as the act of sending an e-mail to a user falsely claiming to be an established legitimate enterprise in an attempt to scam the user into surrendering private information that will be used for identity theft. The e-mail often directs the user to visit a website where they are asked to provide or update personal information, such as passwords and credit card, social security, and bank account numbers, that the legitimate organization already has. But the website to which the user is directed is phony and established to steal the user information during a fake session. For example, a widely recognized website, e.g., eBay, can be targeted in a phishing scam whereby users received e mails supposedly claiming that the user account is about to be suspended unless they clicked-on a provided link and updated the credit card information that the genuine website already had. Because it is relatively simple to make a website look like a legitimate organizations site by mimicking the HTML code, people can be tricked into thinking they were actually being contacted by the website and will subsequently go to the fraudulent site to update or provide their account information. Moreover, by spamming large groups of people (or spIMming them which spam sent over Instant Messaging (IM) applications that can include links to fake sites), the "phisher" could rely on a response from at least some percentage of people who actually had listed credit card numbers with the website legitimately. The concept of phishing in general can also referred to as brand spoofing or carding, a variation on the idea whereby bait is set with the hope that some will bite despite most individuals knowing better. By way of these seemingly legitimate e-mails, criminals "go fishing" for information which is in turn later used to gain access to a real account. Such information includes commonly stolen items in identify theft including a personal identification number (PIN), user account name, a credit card number, and an account number.

The criminal act that is often committed after information is "phished" can be ultimately referred to as "account takeover." These scams are commonly committed by e-mail to users at least partially because millions can be rapidly and efficiently sent to random or selected individuals, but other techniques can involve transmission of a virus through attachments to e-mails. In particular, some viruses can be created to replace the universal resource locator (URL) of a merchant, financial institution or other party commonly stored in a web browser "Favorites" folder. Instead of being routed to an intended legitimate website, the user is sent to a fake or spoofed site where user information is shared unknowingly with a fraudster. Similar in nature to e-mail phishing, another Internet scam referred to as "pharming" seeks to obtain personal or private (usually financial related) information through domain spoofing. Rather than being spammed with malicious and mischievous e-mail requests for you to visit spoof websites which appear legitimate, pharming can "poison" a DNS server by infusing into it false information resulting in a user request being redirected elsewhere. A browser however will indicate the correct website location, which can make pharming a bit more serious and more difficult to detect. A distinction however is that generally phishing attempts to scam people one at a time with an e-mail while pharming allows the scammers to target large groups of people at one time through domain spoofing. Meanwhile, "spoofing" basically includes a variety of ways in which hardware and software can be fooled into operating as if there was a legitimate transaction or exchange taking place. "IP spoofing" more particularly involves trickery that makes a message appear as if it came from an authorized IP address, e.g., e-mails spoofing. As a result, access can be gained to computers through IP spoofing when an intruder sends messages to a computer with an IP address indicating that the message is coming from a trusted host. To engage in IP spoofing, a hacker must first use a variety of techniques to find an IP address of a trusted host and then modify the packet headers so that it appears that the packets are coming from that host.

Malicious software (aka malware) can be also involuntarily downloaded to a computer and designed specifically to damage or disrupt a system by means of a virus or a Trojan horse. A "Trojan horse" is a program that masquerades as a benign application and unlike many viruses, they do not replicate themselves but can be just as destructive. One of the most insidious types of Trojan horse is a program that claims to rid a computer or other device of viruses but instead introduces viruses onto a computer. The concepts relating to fraud detection and prevention can be applied also to other traditional methods of stealing personal information also include e-mail or other means that involve a fake premise or story such as seeking help fleeing from a third world country (e.g., Nigerian scam) or conducting some type of customer service call or transaction (e.g., "Hello, I am from your bank . . . ").

It shall be understood that the description of fraudulent schemes provided herein is not exhaustive and that additional techniques will be developed in the future to improperly gain access to user information. Additionally it shall be understood that accounts and/or devices may be used in various fraudulent events. Fraudulent events may occur online (e.g., may be performed over a network, may be performed using a device and/or may be performed with aid of a processor). Alternatively, a confirmed fraudulent event need not occur online. For instance, a detected fraud event itself may not involve the use of a device and/or may be performed without the aid of a processor.

After a fraud event has been detected, potential devices associated with the fraud event 210 may be detected. Such devices may have zero, one, two, three or more degrees of separation from the fraud event. Such devices may be used with some sort of representative proximity to the fraud event (e.g., temporal proximity, degree of separation proximity).

In one example, devices somehow associated with the event may be identified. The likelihood of their involvement with the fraud event may be assessed based on one or more factors. A device meeting a larger number of factors may have a greater likelihood of being involved with the fraudulent event. The degree to which the device meets one or more of the factors may affect the likelihood the device was involved with the event. A pattern of behavior of the device and associated accounts may be assessed. A behavioral profile of a device and/or an account may be stored and/or compared to other stored profiles. One or more factors may be weighted in calculating the likelihood of involvement of the device. If a factor is expected to play a greater role in the likelihood that the device was involved in the fraud event, the factor may be given a greater weight.

In some embodiments, a device may meet a predetermined threshold in order to be identified as likely involved in the fraud event. The predetermined threshold may be a score or value depending on how many factors are met by the device and/or the degree to which the device meets the factors. In some instances, a plurality of thresholds may be provided to determine a grade or level of likelihood that a device is likely involved in the fraud event. For example, there may be a high likelihood, a medium likelihood, or low likelihood that a device was involved in a fraud event.

A device may be identified as being a prime instigator of the fraud event. Alternatively, a device may be an accomplice device which may not have been the prime instigator, but that may have somehow enabled a prime instigator to cause the fraud event. Both prime instigators and accomplices may be perpetrators of fraud.

Potential victims may be identified 220. In some instances, potential victims may be identified after identifying potential perpetrator devices. In some instances, if a device is identified as being involved in a fraud event, the accounts associated with or touched by the device may be identified. For example, if the device was used to access an account, the account and/or user of the account may be potential victims.

In some embodiments, the likelihood of an account or associated user being a potential victim may be evaluated based on one or more factors. For example, if the device exhibited behavior with the account that matches other behavior for known fraud events, the likelihood of the account/user becoming a potential victim is increased. The types of activities that may have occurred involving the account that may deviate from normal activities for the account may also be indicative of likelihood of being a fraud victim, even if no verified fraud event has occurred. Additional factors such as frequency of contact between the device and account, type of contact, type of transactions or actions, demographics of a user of the account, or other information may be considered.

In some instances, one, two, three or more potential victims may be identified. The potential victims may be part of one or more victim circle. Potential victims within a victim circle may share one or more characteristics. In some examples, potential victims of a single perpetrator device, or devices associated with a single fraud event may be grouped in to a victim circle. For instance, a victim circle may include accounts that were accessed by the same device. A victim circle may also be organized by user demographics, behavioral characteristics, account activity, related devices or accounts, or any other information.

Victim circles may have any number of potential victims within them. Any level of threat may be associated with individual victims or the victim circles. In some instances, each potential victim may have a calculated risk level. Similarly, in some instances, victim circles may have calculated risk levels.

A fraud containment method may include recommending action based on a threat risk 230. For example, if a risk of threat is considered to be high for a victim circle, it may be recommended that action be taken to protect the victim circle. In another example, if the victim circle has a large number of potential victims, then it may be recommended that action be taken to protect the victim circle.

In some instances, recommending action may include prioritizing which potential individual victims or victim circles receive action first. Furthermore, the suggested course of action may depend on the likelihood of fraud or the type of fraud, weighed against potential inconvenience to users of accounts.

In some embodiments, as previously described, a fraud event may be detected. Suspicious activity may be detected. In some embodiments, the suspicious activity may be confirmed as a fraud event. The suspicious activity may be confirmed as a fraud event by an entity. The entity may be an entity associated with an account. For example, the account may be a bank account, and the entity may be the bank to which the account belongs. Examples of entities may include various individuals, companies, corporations, partnerships, groups, or associations, such as financial institutions, credit card companies, commercial institutions, online communities, online service providers, web site operators, or any other groups. In some instances, the suspicious activity may be confirmed as fraud by an individual. The individual may be a user associated with an account that was involved in the fraudulent transaction. For example, the user may have a bank account, where the user confirms that the user did not make certain transactions. A suspicious event may be confirmed to be a fraud event by a third party. The third party need not be associated with an account. In some instances, a fraud containment system may receive notification of a confirmed fraud event.

In some instances, an event may be suspected to be a fraud event with a certain degree of certainty. One or more factors may be considered when determining the likelihood of a fraud event. In some instances, the likelihood of fraud may have a value along a continuous scale. Alternatively, the likelihood of fraud may fall into one or more predetermined categories or levels. In some instances, when the likelihood of fraud exceeds a predetermined threshold, the event may be considered confirmed as a fraud event.

The fraud event may be any kind of fraud event, such as those described elsewhere herein. The fraud event may include fraudulent transactions, and/or stolen credentials. The fraud event may have occurred online or offline. The fraud event may have been detected online or offline.

Figure 3:
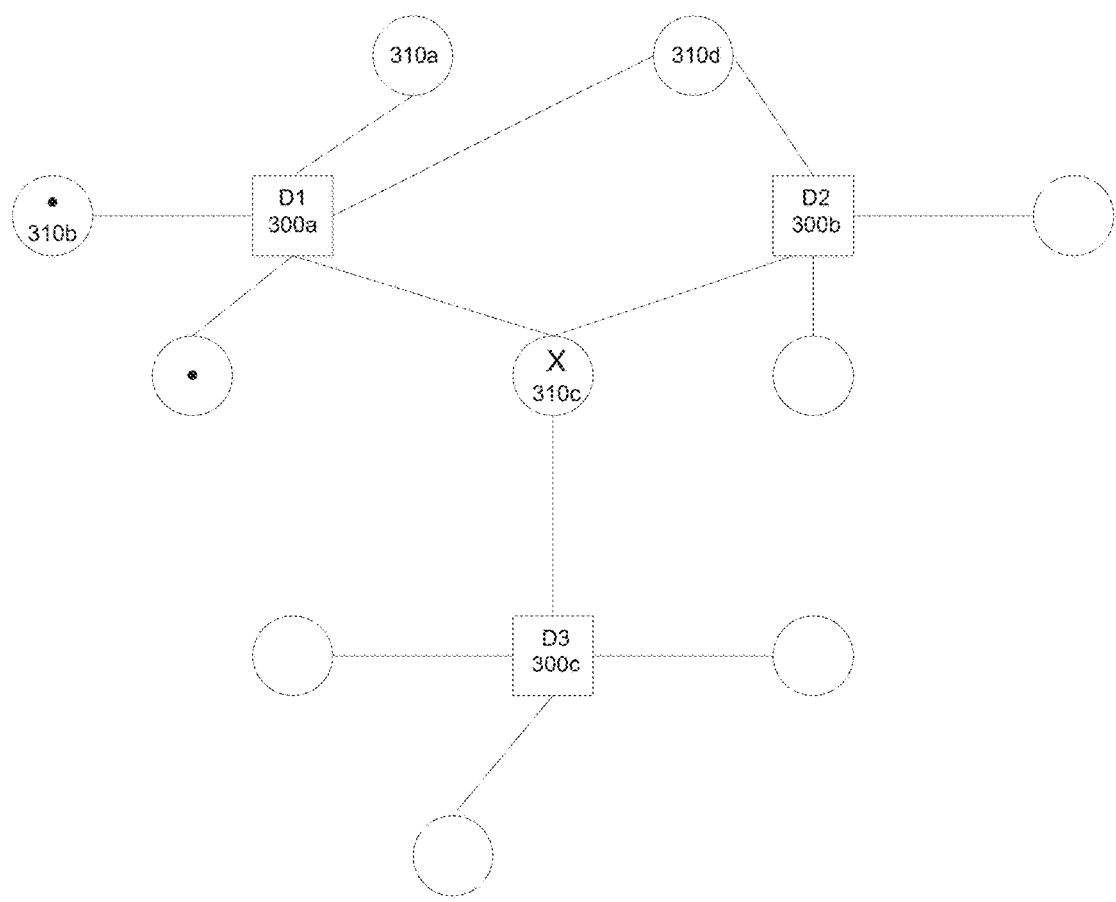
FIG. 3 illustrates an example of relationships between a detected fraud event and associated devices.

After a fraud event has been detected, devices that may have been associated with the fraud event may be identified. FIG. 3 illustrates an example of relationships between a detected fraud event and associated devices. For example, a plurality of devices 300a, 300b, 300c may be provided. The devices may have touched upon a plurality of accounts 310a, 310b, 310c, 310d. The devices may have touched upon the accounts by being used to access the accounts. For example, a user may use a device 300a to access an account 310a.

In some instances, a fraud event may be detected. The detected fraud event may be associated with an account 310c. The fraud event may be a confirmed fraud event. In some embodiments, a plurality of devices, e.g., D1, D2, and D3, may have been associated with the account that experienced the fraud event. In some instances, the plurality of devices may have been used to access the account. A user may have used the devices to log into the account.

In some instances, information about other accounts that have been accessed by the devices may be available. In some instances, data about the devices and accounts may be stored and aggregated. Associations between devices and accounts may be stored in memory. In some embodiments, when a fraud event is detected 310c, records of the associated devices 300a, 300b, 300c may be examined. In some instances, records of accounts 310a, 310b, 310d that are associated with the associated devices may be examined as well.

The account records may include records of devices that accessed the accounts, when the devices accessed the accounts, information about the account user(s), how the accounts were used, activity on the accounts, or any other information associated with the accounts. In some instances, the records of the accounts may include one or more indicators that are similar to a characteristic of the fraud event. For example, an account 310b may include one or more indicators that may parallel a record relating to an account 310c associated with a confirmed fraud event. For example, a behavior pattern that was involved with account 310c may also have been exhibited for account 310b. Thus, although no fraud has occurred or been confirmed for account 310b, there may be some similarities that may suggest that fraud has or may occur in the future, or that the device 300a that there may be suspicious activity associated with the device associated in both transactions.

In the example provided in FIG. 3, one of the devices 300a may have more accounts that reflect behavioral similarities or other similarities with an account associated with fraud. In some instances, this may be an indicator that the device may be a fraud perpetrator. In some instances, this may increase the likelihood/risk that the device is involved in fraudulent activity. In some instances, a device 300a with other suspicious activity may have a higher likelihood of fraud than a device 300b, 300c that does not provide any indication of suspicious activity.

Figure 4:
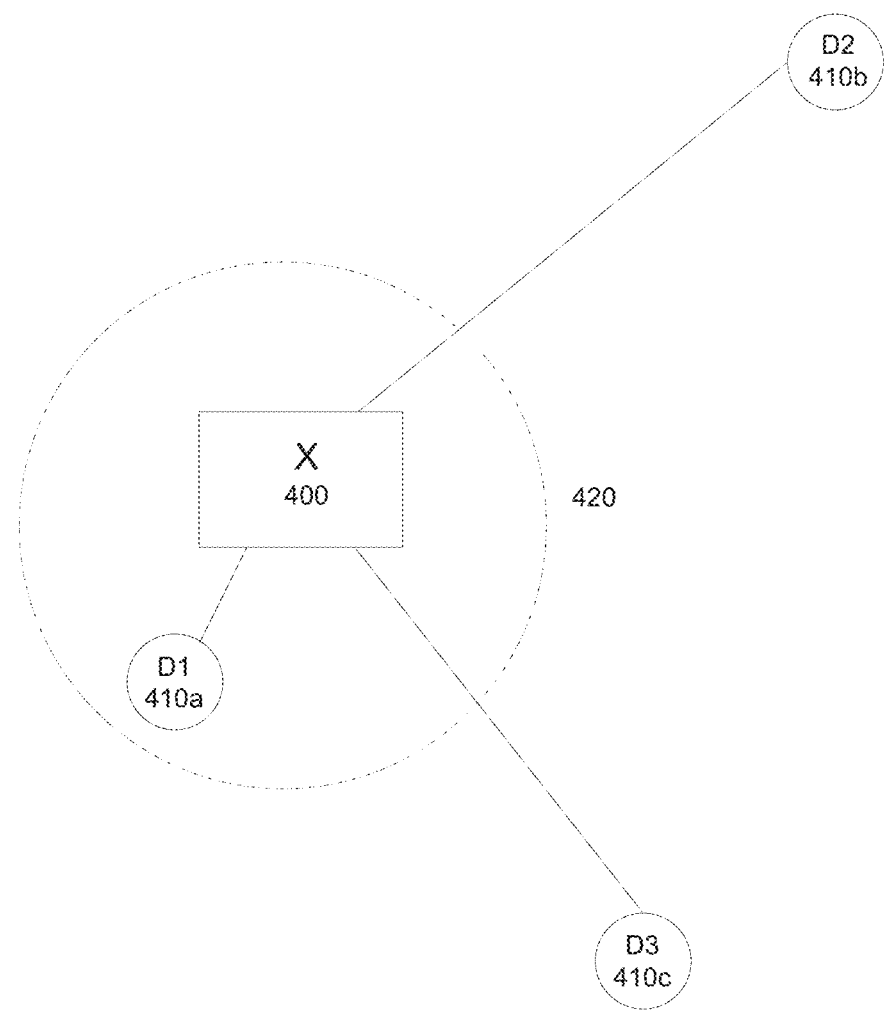
FIG. 4 shows an example of device proximity to a fraud event.

FIG. 4 shows an example of device proximity to a fraud event. A device's proximity to a fraudulent event may be an indicator of the likelihood that the device is a fraud perpetrator. A device's proximity to a fraudulent event may be based on relational proximity, temporal proximity, geographic proximity, device activity (e.g., device behavior), device settings, or any other information. A device proximity to a fraud event may be symbolic of the closeness of a device's relationship with the fraud event.

A fraud event 400 may be provided. In some instances a fraud event may be associated with an account. One or more devices 410a, 410b, 410c may have been associated with the account. The device's proximity or relation to the fraud event may be determined. Based on the device's proximity or relation to the fraud event, the device may be identified as a potential fraud perpetrator.

The fraud event may be a confirmed fraud event. The fraud event may have occurred online. For example, the fraud event may be a transaction that occurred using one or more device. The fraud event may be a transaction that may have occurred over a network, such as the Internet. The fraud may include the transfer or exchange of information. In some instances, the fraud event may include the transfer or exchange of money. In some instances, the fraud event may have occurred offline. For example, the fraud event may include a forged check or bank note. The fraud may incorporate the use of tangible items, such as documents, financial instruments, identification papers, health-related papers, insurance documents, or any other type of tangible item. The fraud may include falsification of information, items, or documents.

The fraud event may be associated with account. The fraud event may be associated with an identity or item that may be associated with an account. For example, the fraud event may include a falsified document, such as a check, which may be associated with an individual (e.g., allegedly the individual's check), that may be associated with an account (e.g., the individual's bank account). The fraud event may be directly or indirectly associated with an account. An account may be provided for services for a user of the account. A user of an account may or may not have a verified or verifiable identity.

One or more devices may be associated with the account. For example, a device may be used to access the account. For instance, a user may log into an account using a computer, mobile device, or other device. The device may be listed as a device that is authorized to access the account. One or more device may be associated with an individual. For example, the device may be used by an individual who may be a user of the account, or who may have accessed the account.

Additionally, one or more devices may be associated with the fraud event. The device may have been detected to have been in use during the fraud event. For example, a device may be used during a fraudulent transaction. The device may be a perpetrator of the fraudulent transaction or may be the recipient of a benefit of the fraudulent transaction. The device may be associated with the fraud event through the account, individual, or any other factor that may tie the device to the fraud event.

A device may have a "proximity" to the fraud event 400. In some embodiments, a plurality of devices may be somehow associated with the fraud event. One or more devices 410a may be in closer proximity to the fraud event than other devices 410b, 410c. In some instances, one or more factors may be evaluated to assess a device's proximity to the fraud event. For example, if the device was used during the fraud event and/or somehow initiated the fraud event, the device may have a closer proximity to the fraud event, than another device that may have been used to access the account at an earlier or subsequent time. Another example of a factor that may be used to determine proximity may be behavior. For example, if the device is in use when unusual account activity occurs, this may be considered a red flag that may increase the proximity of the device to an event, especially if the unusual account activity is tied to the fraudulent account activity. Even if the unusual account activity is not directly tied to the fraudulent account activity, its proximity to the fraudulent account activity may still contribute to bringing a device closer to a fraud event. If the unusual account activity is similar to or mirrors any other account activity that occurred in a similar matter to other fraud events, the proximity of the device to the fraud event may be increased. In another example, even if the event is not unusual, if it fits a behavioral profile that is similar to or mirrors other behavior profiles in other fraud events, the proximity of the device to the fraud may be increased.

Behavioral profiles may be created and/or tracked. For example, a behavior profile may be created for an account. The account activity may be stored and/or tracked. For example, it may be known when the account was accessed. The device information for the account accesses may be tracked. For example, the IP addresses, clock information, geographic location, or settings of the devices used to access an account may be stored and/or tracked. Account setting changes may be stored and/or tracked. For example, changing user identification information, contact information (e.g., addresses, email addresses, phone numbers), privacy settings, passwords, credit card information, bank account information, payment schedules, or authorized devices (e.g., adding new devices, removing existing devices) may be tracked. Account transactions or other activity may be stored and/or tracked. Frequency of account activity, types of account activity, or other information associated with the account activity may be stored/tracked.

In some instances, particular account activity may automatically increase the proximity of a device to a fraud event. For example, suddenly increasing the number of transactions, and changing the address of the beneficiary may be a red flag that may increase the likelihood of a fraud event. In some instances, the account activity in itself may not be overtly suspicious, but when coupled with other factors may increase the proximity of a device to a fraud event. In some instances, aggregated data may be considered to determine which account activities fit a behavior profile that may cause the device to have a closer proximity to a fraud event. Suspicious behavior profiles may be generated based on the aggregated data. When particular behaviors are associated with an increased likelihood of a fraud event, the behavior profiles may be marked as suspicious.

A device that may show up repeatedly at the wrong place at the wrong time may be considered to be a suspicious device, and its proximity to a particular fraud event may be increased. For example, even if it is not understood what role a device may play in a fraud event, the repeated association of a device with potential fraud events, or accounts or individuals linked to fraud events may increase the likelihood the device was somehow involved. For example, a device may repeatedly show up inline in accounts. A day later someone may call a call center and change the contact address or password for such accounts. Even though the device itself was not directly involved in changing the password (e.g., it was done through the call center), there may be a strong correlation between the online appearance of the device and the call to the call center. The aggregation of data may create an opportunity to see such habitual repeating behavior.

A predetermined threshold may be provided, where a device 410a that is closer to a fraud event 400 than the predetermined threshold 420 may have an increased likelihood of being associated with the fraud event. In some instances, if the device has a greater proximity to the fraud event, the device may be identified as a fraud perpetrator. In some instances, a single predetermined threshold may be provided, which may determine whether a device is a fraud perpetrator or not. In some instances, a plurality of predetermined thresholds may be provided which may be used to indicate a likelihood that a device is a fraud perpetrator. For example, devices that cross a closest predetermined threshold may be considered to have a high likelihood of being a fraud perpetrator. Devices that cross a further away threshold may be considered to have a moderate likelihood of being a fraud perpetrator. Devices that cross an even further away threshold may be considered to have a low likelihood of being a fraud perpetrator. Devices that are even further away may be considered to have an extremely low likelihood of being a fraud perpetrator.

A device may be identified as a fraud perpetrator or having a certain likelihood of being a fraud perpetrator. In some instances, the role that a device may have played in the fraud may be identified. For example, the device may be considered a master perpetrator, or may be considered as an accomplice. In some instances, a master perpetrator may be involved in the fraudulent event itself. For example, a master perpetrator may be a device used to access an account and that was used to make a fraudulent transaction. In another example, an accomplice device may be a device that was used for an activity that wasn't the fraud event itself, but that appears to have some relation to the fraud activity (e.g., device used to access accounts, where later a call is placed to a call center to change passwords or contact information for those accounts). An accomplice device may be a device that is at the "wrong place at the wrong time." An accomplice device may have some sort of conceptual proximity to the fraud event without being directly linked to the fraud event, or the link being unknown.

Figure 5:
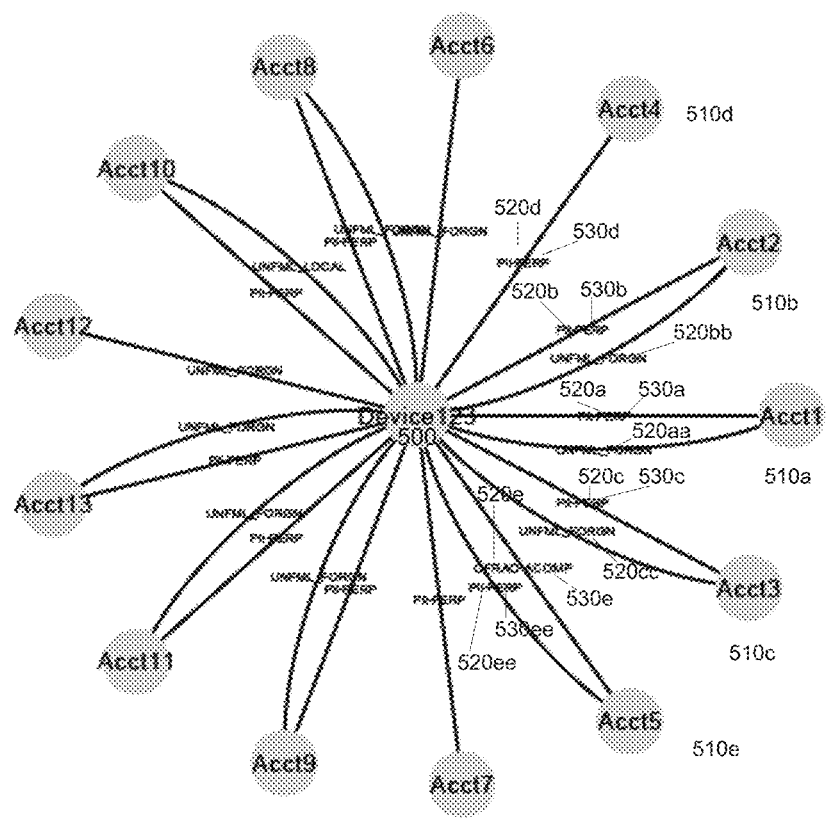
FIG. 5 illustrates relationships between a device and related accounts.

FIG. 5 illustrates relationships between a device and related accounts. A device 500 may have compromised one or more accounts 510a, 510b, 510c, 510d, 510e. A device may have comprised any number of accounts. For example, the device may have compromised a single account, two or more accounts, three or more accounts, four or more accounts, five or more accounts, ten or more accounts, twenty or more accounts, thirty or more accounts, fifty or more accounts, a hundred or more accounts, or a thousand or more accounts.

Activities and/or interactions between the device and the accounts may be tracked. In some embodiments, a first part of the interaction 520a, 520aa, 520b, 520bb, 520c, 520cc, 520d, 520e, 520ee may relate to the type of interaction. For example personally identifiable information (PH) such as a change in customer contact information may be tracked, check fraud (CFRAUD), unfamiliar foreign (UNFML_FORGN), unfamiliar local (UNFML_LOCAL), may be examples of types of interactions. Additional types of interactions may be provided. Any number or types of interactions may be tracked. In some instances, a single type of interaction may be recorded between a device and an account. Alternatively, a plurality of types of interactions may be recorded between a device and an account. In some instances, all applicable types of interactions between a device and an account may be recorded.

A second part of the interaction 530a, 530b, 530c, 530d, 530e, 530ee may represent the role that a device plays. For example, a device 530a may be a direct perpetrator (PERP), which may be a device having a direct involvement with an activity. In one example, the device may have a direct involvement with fraudulent activity. In another example, a device 530e may be a potential accomplice (ACOMP). The device may not directly be involved, but may show up with a close time proximity to the event.

Additional parts of the interaction may be tracked. In some instances, a device may function as a direct perpetrator for a first type of an interaction and as an accomplice for a second type of interaction with the same account. For example, a device 500 may be a direct perpetrator 530ee, for personally identifiable information 520ee, and an accomplice 530e for check fraud 520e for the same device 510e. In other instances, the device may function as a direct perpetrator for multiple types of interactions, or as an accomplice for multiple types of interactions.

Systems and methods may be provided for identifying devices that may have assisted in the compromise of accounts whose credentials have been stolen. Such systems and methods may comprise (i) a system for receiving notifications of confirmed compromised credentials; (ii) a system for identifying devices that logged into the compromised accounts; and (iii) a system for retrieving the device risk profiles and scores calculated by systems and methods described herein. Such systems and methods may be useful for determining potential fraud perpetrator devices. The likelihood of a device being a fraud perpetrator may be assessed based on the device risk profiles.

In some embodiments, methods and systems may be provided for assessing the confidence level or level of trust for one or more devices. These can be used to identify a physical device and determine its suitability for linking together accounts accessed by a common device. In some instances, the confidence level or level of trust may be used in determining whether the device was involved in fraud. An increased confidence level for identifying a device may increase the confidence level of whether an assessment of whether the device is involved in fraud is accurate. Moreover, a method and system may be provided for determining the likelihood that a device logging into an account was an accomplice in confirmed fraud reported against an account. An increased confidence level or level of trust for identifying a physical device may also increase the likelihood that an assessment whether a device was an accomplice is accurate.

As relationships between devices and accounts are identified, potential victims may be identified. Once devices who have potentially been involved in fraud have been identified, potential victims may be identified based on the interactions between such devices with various accounts. The types of interactions and behavior profiles between the devices and accounts may be stored and/or tracked. Such stored information may be useful for identifying potential victims, based on the relationship between the devices and accounts.

In some instances, single victims may be identified based on a relation between a device and the account. For example, if the device is known to be involved in fraudulent activity, any account associated with the device may be automatically considered a potential victim. In another example, additional factors may be considered in determining whether the account is a potential victim. For example, even if no fraud event has yet been detected at the account, if the device-account interactions fall within a set of suspect interactions, the likelihood that an account is a potential victim may increase. For example, certain interactions may be flagged as being potentially suspicious. For example, sudden password changes coupled with other account activity may indicate an increased likelihood that the account is a victim account.

In another example, behavior between the device and account may be compared to other behavior profiles to determine whether there is an increased likelihood that the account is a victim account. The compared behavior profiles may be between the same device and other accounts. The other accounts may include accounts for whom known fraud events have occurred, or for whom there is a high likelihood that fraud has occurred. The compared behavior profiles may also be between other devices and other accounts. The other accounts may include accounts for whom known fraud events have occurred, or for whom there is a high likelihood that fraud has occurred. The other devices may include devices who have been identified as fraud perpetrator devices, or who have passed a predetermined threshold to have a particular likelihood of being a fraud perpetrator device.

In some instances, victim circles may be identified. Victim circles may include one or more victims who may have one or more shared characteristic. In some instances, a victim circle may include potential victims of the same device. For example, the common characteristic may be that each of the victims within the victim circle may have interacted with the same device, or that fraud may have been perpetrated by the same device. The same device may have perpetrated the fraud as a direct perpetrator or as an accomplice. The same device may have been used to log into the accounts.

Other examples of potential common characteristics may include demographics of a user of the account, relationships between users of accounts, account access location, account access time zone, frequency of account access, behavioral trait of account, type of account, entity with whom the account is affiliated, financial transactions associated with accounts, or any other characteristics.

FIG. 6 provides an illustration of victim circles in accordance with an embodiment of the invention. For example, one or more victim circle 600*a*, 600*b*, 600*c* may be tracked. In some instances, the potential victims within the victim circles may or may not overlap. For example, a single potential victim may belong to one, two, or more circles. Any number of potential victims may belong to one, two or more circles. In some instances, different victim circles may have different numbers of potential victims. In some embodiments, the overall threat level for a particular victim circle may take the number of potential victims into account. For example, a victim circle having a higher number of potential victims may have an increased threat level compared to a victim circle having a lower number of potential victims. In one illustration, Victim Circle 1 600*a* has a larger number of members than Victim Circle 3 600*c*, which may suggest that Victim Circle 1 has a higher threat level than Victim Circle 3.

In some instances, a degree of risk for a victim may be assessed. In some instances, there may be only two degrees of risk (e.g., is a victim, is not a victim). In some instances, three or more degrees of risk may be provided (e.g., high likelihood of being a victim (+), moderate likelihood of being a victim (•), or low likelihood of being a victim (−)). In some instances, the degree of risk of being a victim may be a numerical value (e.g., between 1 and 10, between 0 and 100). The degree of risk may be continuous along a scale, or may have discrete values. In some instances, each potential victim within a victim circle may have an assessed level risk. The level of risk for various victims within a circle may be the same or may vary.

In some embodiments, the overall threat level for a particular victim circle may take the risk level of the member victims into account. For example, a victim circle having more potential victims with a higher risk level may have an increased threat level compared to a victim circle where the member victims have a lower threat level. In one illustration, Victim Circle 2 600*b* has members with a higher risk level (+) than members of Victim Circle 3 600*c* (−), which may suggest that Victim Circle 2 has a higher threat level than Victim Circle 3.

When assessing the threat level for victim circles, additional factors may be considered. For example, the potential impact of the threat (i.e. in addition to the number of victims in the circle) may be considered. The potential impact may include a financial amount. For example, if larger value financial transactions or more frequent financial transactions are occurring, the threat level may be elevated. Additional potential ramifications that may be considered are whether there is any threat to safety or security. Various types of fraud threats may be prioritized.

Factors in assessing the threat levels of individual victims and/or victim circles may be weighted and/or prioritized. For example, the size of the victim circle may be given greater weight than the risk level for the member victims. In such an example, Victim Circle 1 600*a* having a larger number of potential victims may have a higher threat level than Victim Circle 2 600*b*. In another example, the risk level for the member victims may be given greater weight than the number of potential victims. In such an example, Victim Circle 2 having higher risk levels for its member victims may have a higher threat level than Victim Circle 1. Any number of factors may be considered and/or weighted to determine threat levels for the various victim circles.

Systems and methods for identifying circles of at-risk customers targeted by a common physical device may comprise (i) a system for identifying physical devices accessing victims over an electronic network; (ii) a system for assessing the confidence level in the identifying the device and the validity of a victims circle associated with it; and/or (iii) a system for maintaining counts of interactions between the device and each potential victim.

In some instances, the system may keep a running count of each interaction between a device and an account. The counts may be kept for all transactions, regardless of whether a device has been identified as a potential fraud perpetrator or whether an account has been identified as a potential victim. The interactions between various devices and accounts may be tracked and/or counted. In another example, the running count may be kept for only selected devices and/or accounts. For example, running counts of interactions may be kept after a device has been identified as a potential fraud perpetrator device, or as a confirmed fraud perpetrator device. The counts may be kept between the device and all accounts that the device interacts with (e.g., regardless of whether the account is a potential victim). In another example, the counts may be kept for interactions between the device and accounts that have been identified as potential victims (e.g., that have reached a threshold or likelihood of being a victim).

Systems and methods for profiling the interaction between a device and individual potential victims and the device and the circle of victims may be provided. Such systems and methods may further comprise (i) a system for keeping counts and other statistics of the device interactions with individual accounts; (ii) a system for maintaining counts and other statistics of the device interactions with the victim group as a whole; and (iii) a system for executing rules that associate risk levels with specific combinations of statistics.

In some instances, the counts and/or statistics between a device and individual accounts that form a victim group may be added and/or aggregated to determine counts and/or statistics between the device and the victim group. For example, a running count may be kept of the number of interactions between a device and a first account, and a device and a second account. The number of interactions may be tracked separately for each account. The first and second account may belong to the same victim group. The counts for the first and second accounts may be added to determine counts for the victim group. Alternatively, separately, counts may be kept for a group, so when a count is added for a member of the group, the count is automatically added to the group as well. Examples of statistics may include the number of interactions, the interactions over time, average interaction rate, types of interactions, or additional statistics.

A method may be provided for aggregating risk scores from a circle of victims associated with the same device. For example, the member victims of a circle may be associated with the same device. The interactions between the device and the member victims may be counted and added for the victim circle. In another example, a risk score may be assessed between the device and each member victim. The individual risk scores may be added to form an aggregated risk score between the device and the victim circle.

In some embodiments, a method for aggregating risk scores from multiple circles of victims to assess the threat level associated with the entire network may be provided. For example, a risk score for individual victim circles may be calculated. The individual victim circles may be associated with the same device or with different devices. The various victim circles may or may not be associated with the same device. A risk score may be assessed between a device and each victim circle. The individual victim circle scores may be added to form an aggregated risk score for the entire network.

After threat levels for individual victims and/or victim groups have been assessed, a response to the threat may be determined. In some instances, depending on the threat level, a priority of response may be determined. For example, higher threat levels may be addressed first. In some instances, limited resources may be available that may result in certain threats being addressed first, before additional threats are addressed. Once resources are freed up after addressing the first prioritized threats, the resources may move on to address subsequent prioritized threats. In some instances, the threat priority may be adjusted in real-time. In some instances, threats may be addressed manually with human intervention, or automatically without human intervention. For example, an assessment may be made by an individual whether to freeze particular accounts in response to suspicious activity. Alternatively, a processor may determine based on analytics to automatically freeze one or more account.

In some instances, responses may be prioritized or timed based on the status of the threat. For example, in some instances, further observation may be warranted before any response is instituted. Such victims or victim circles may be monitored under it is determined that the time is ripe for a response.

The type of response to a potential fraud threat may also be determined. For example, account activity may be monitored, or frozen. Access to accounts may be cut off for one or more particular devices. Access for accounts may be granted only to particular approved devices. Certain types of account activity may be permitted while others are not. Additional responses that may not involve online actions may be provided. For example, if bad checks are detected, notifications may be provided one or more entities warning of the bad checks.

In some instances, a recommendation may be made for the response to the assessed threat(s). The recommendation may or may not be followed. The recommendation may be made automatically without requiring human interaction (e.g., with aid of a processor). Alternatively, human involvement may be provided in making the recommendation, or in determining whether to follow the recommendation. In some instances, a recommendation may automatically be followed after it is formulated.

Systems and methods described herein may use at-risk victim circles to assist in prioritizing and directing rapid-response and attack-containment activities. Such systems and methods may further comprise (i) a system for retrieving the victim circles identified as high risk; and/or (ii) a system for serving the list of accounts included within the victim circles identified as high risk.

In some embodiments, systems and methods may be provided for assessing the threat/vulnerability of individual victims, individual victim circles and the network as a whole. The systems and methods may also include (i) a system for weighting the risk scores of individual victim circles and aggregating the number of accounts included in them; and (ii) a system for reporting the aggregated results.

Additionally, there may be expanded monitoring coverage for combined networks of multiple organizations. Such systems and methods may further comprise (i) a system for translating reported events to a common standard enabling uniform description of contributing organizations and event types; and (ii) a system for enforcing data-sharing policies and preventing inadvertent disclosure of unpermitted information.

FIG. 7 shows an example of a consortium for sharing fraud-related data in accordance with an embodiment of the invention. A consortium may have one or more user devices being connected to one or more online organizations or hosts that share user device or interaction information with a fraud repository that is part of the consortium in accordance with one embodiment of the invention.

The online organizations connected to the one or more user devices may be any sort of host, such as an electronic commerce business, an online merchant, a financial institution, or any other type of website service provider that may provide a service to a user or may interact with a user device. An online organization and a user device may perform an electronic transaction, such as a purchase of a product or service, such as online banking. In accordance with one aspect of the invention, each electronic transaction may be susceptible to fraud and each user device or user can be identified to reduce the risk of fraud. In some instances, online organizations may have their own networks or be fraud-detecting entities.

The connection between a user device and an online organization may be, for example, a connection between a client computer and a website server over a network (see FIG. 8). One or more servers may communicate with one or more client computers across a network. The network, for example, can include a private network, such as a LAN, or interconnections to the online organizations over a communications network, such as the Internet or World Wide Web or any other network that is capable of communicating digital data, such as a wireless or cellular network. Each user device may connect to any online organization over the network using data protocols, such as HTTP, HTTPS and the like. In some instances, one or more victims may be detected per network. In some instances, one or more victim circles may be detected over a network. In some instances, an online organization may track victims and/or victim circles. The online organization may also track devices that are potentially involved in fraud events.

When a user device is communicating with the consortium, the device memory may store an operating system (OS) and a browser application. For example, the operating system may operate to display a graphical user interface to the user and permit the user to execute other computer programs, such as the browser application. The browser application, such as Microsoft Internet Explorer, when executed by the processor, permits the user to access the World Wide Web as is well known. The user device may interact with an online organization that is part of the consortium, which may perform some fraud prevention and detection functions and may generate a device identifier derived from information gathered about the user and/or user device in accordance with the invention. The user device may or may not be involved in fraudulent transactions. The confidence with which the system may track the identity of a user device may assist with determining whether the device is a fraud perpetrator.

In some embodiments, an online organization may have one or more web-based server computers, such as a web server, an application server, a database server, etc., that are capable of communicating with a user device over a network, such as the Internet or a wireless network, and are capable of downloading web pages to the user device. In some implementations, the online organization may comprise one or more processors, one or more persistent storage devices and a memory. For the online organization to interact with the user devices, the memory may store (and the processor(s) may execute) a server operating system and a transaction processing software system to facilitate an electronic transaction between the online organization and one or more user devices. Each online organization may further comprise a database, such as a database server or a data structure stored in the memory of the online organization, that stores the electronic transaction data for the online organization. In some embodiments, a server for an online organization may have greater computing or processing power than a user device. Similarly, the server may have more memory than a user device.

The online organization may control each device and/or each user's access to the resources of the online organization by, for example, denying access to a user or device in particular circumstances. For example, if a user device has been implicated in fraud, an online organization may prevent a transaction with the user device from occurring. In another example, if a user has a 'bad' or 'low' rating, an online organization may prevent the user from participating in an electronic sales forum. If a user device has been implicated in fraud, the device interactions with various accounts of the online organization may be monitored. Past interactions may be reviewed and current interactions may be stored as they occur. Further potential victims of fraud may be identified.

In a preferable embodiment of the invention, the online organizations may be connected to a fraud repository. The fraud repository or fraud detection monitor that is part of a fraud detection consortium may be connected to the online organizations over a network. If the central repository is connected to the network, then the data between the online organizations and the fraud repository may be encrypted or may travel over a virtual private network to ensure privacy and security.

Thus, the fraud repository may receive user and/or user device information from each online organization, which may collect user or user device information from each user device during an online transaction. The fraud repository may also receive information about user accounts and interactions between devices and accounts. Behavioral profiles relating to device and/or account activity may be received as well. In some instances, interaction counts between devices and individual accounts or account circles may be received at the fraud repository. Interaction counts or profiles between potential fraud perpetrator devices and individual victims and/or victim circles may be received at the fraud repository. For example, a banking consortium of any number of members may be established for sharing fraud-related data, shared-monitoring of behavior, including counting the number of accounts accessed by the same device across multiple banks. Although in some instances a fraudster may not have accessed enough accounts in any single bank, shared insight may result from the ability to detect the behavior across banks in the aggregate. In some embodiments of the invention, one or some members of the consortium could be delegated the responsibility of identifying risky or untrusted devices, while others could handle other steps and processes described herein such as counting or tracking the number of accounts accessed by a device across banks. It shall be understood that any of the described methods or functions of the fraud repository or consortia members are not necessarily carried out by a single entity but rather such functions may be separated and divided up among its members, their customers or designated third parties.

The repository may store some or all of the information received. In some implementations, the fraud repository may generate a device identifier that identifies each user device. In some cases, the device identifiers may be unique identifiers for each user device. In other cases, the device identifiers may not be unique for each user device, but may be derived from information gathered about a user and/or user device which may or may not be duplicative in another user device. In some cases, a device identifier may function as a "fingerprint" of a user device, and include various parameters derived from gathered information about a user and/or user device to be discussed in greater detail below.

The fraud repository may use a device identifier to determine whether a device described through a first online organization is the same as a device described in a second online organization. This may assist with identifying whether a device is involved in fraudulent transactions. The behavior of a device may be tracked across multiple organizations. If a device is identified as a fraud perpetrator potential victim circles may be determined. In some instances, a victim circle may have been identified for a particular device through a first online organization. An additional victim circle may have been identified for the same device through a second online organization. Information about the victim circles may be shared and/or combined. Similarly, identifying a potentially fraudulent device in a first organization may assist with determining a victim circle associated with the device at a second organization. The sharing of information may assist with identifying potential fraud perpetrators and/or victims. As with other embodiments and aspects of the invention, the concepts herein not only apply to confirmed fraudulent devices, but also to untrusted, risky devices or those devices assessed with a high level of risk or threat.

Using the identification information in accordance with the invention, the fraud repository may be able to detect fraudulent activities across the consortium. In particular, the fraud repository may provide a centralized service utilizing this invention to identify user devices, store user and device information, track end-user logins, associate an end-user account with one or more specific devices, associate a device with one or more end-user accounts, associate a device or end-user with fraudulent activity, and share this information with each online organization of the consortium. The fraud repository may include a centralized database.

Any action taken within a fraud detection consortium may be directed by computer readable media, code, instructions, or logic thereof. These may be stored in a memory, such as the memory of a fraud repository or the memory for an online organization.

In one example, a user computer, such as A1, may request access to the fraud detection consortium and a particular online business, such as A. To gain access to A, complete a transaction, or access a particular part of the network, a user may connect through a user device, which in this case may be user computer A1. The online business A may receive user and/or user information from the user computer and may then pass the information to the fraud repository. The online business may or may not store the information gathered through the user device that is passed onto the fraud repository.

In some implementations, the fraud repository may generate a computer identifier which may be derived from the information gathered. In other implementations, a computer identifier may be generated at different stages. For example, an online business A may gather information from A1 and may generate a computer identifier for A1, and may pass the computer identifier to the fraud repository. The online business A may only pass the computer identifier, may only pass gathered information, or may pass a combination of both to the fraud repository.

Information or data, such as a computer identifier, raw data, data used to make up the computer identifier, or any combination thereof may be stored in "pairs." Any type of data may be coupled with the same or different type of data when stored in memory. The paired data may be linked within memory where they are stored, or may have some other mechanism that associates them with one another. In one example, an email address and a computer identifier may be stored as a pair. The email address and computer identifier may be stored in memory together, as a unit of data. Alternatively, they need not be stored together but may include pointers that associate them with one another. Although the term "pair" may be used, any number of data items may be linked in memory. For example, two, three, four, five, six, seven, eight, ten, twelve, fifteen, twenty, thirty, forty, fifty, eighty, one hundred, two hundred, or more items may be linked in memory. As discussed in greater detail below, any of these linked sets of data may be shared together.

In one embodiment, the fraud repository may store some or all of the information. For example, the fraud repository may store all of the information gathered by online business A, B, C, D, and any other businesses in the consortium. Online businesses A, B, C, and D may or may not also store the information that is stored by the fraud repository. The fraud repository may share some or all of the information gathered or generated, such as computer identifiers, detected fraud information, or potential victim information with the online businesses of the consortium.

In an alternate embodiment, the fraud detection monitor or repository may facilitate transfer of information between one or more online business without actually storing the gathered information. For example, information gathered by online business A may be stored on A's server, and information gathered by online business B may be stored on B's server. The fraud detection monitor may enable transfer of information from A to B, C, D, and any other businesses and so forth for the other online businesses. The fraud detection monitor may also process information, with or without storing it on a fraud detection monitor server, such as generating computer identifiers or detecting fraud from information gathered from one or more online business, and may share this information with the online businesses of the consortium. The fraud detection monitor may detect fraud by cross referencing the gathered information and tracking user and device behavior over time. In some cases, the fraud detection monitor may only store processed information, such as computer identifiers or fraud indicators.

In some embodiments, each online business may represent different private network environments operated by independent organizations that do not share end-user identities. The data storage system, such as a set of databases, used by each online business may be remotely located at the fraud repository and can be a service provided by a third party. Alternatively, online businesses may communicate via a network, such as the Internet, such that end-user identifiers, fraud information, device, and/or account information may be shared.

Another example provides fraud detection and information processing applications distributed across a plurality of computing devices (with no central fraud repository and database). The computing devices may be the online businesses' devices, the user devices, or a combination of the user devices and online businesses, such that each may perform part of the functions of the fraud detection and prevention system in accordance with the invention. For instance, the various online businesses may share information with one another in a peer to peer manner, and may collectively detect fraud and/or identify devices or victims of fraud. In one case, online business A may detect an at-risk user device and share this information with online businesses B, C, D, and so forth. In another case, online business A may detect suspicious user devices and share such information with the other online businesses. Online businesses A, B, C, and D may share information in a peer to peer manner such that they all have access to certain information. Similarly, multiple networks may share information in a peer to peer manner.

Those skilled in the art will appreciate that the fraud detection/containment consortium may be implemented in various different manners that are within the scope of this invention, such that previous discussions are provided by way of example only and are not limiting.

One aspect of the invention provides for multiple consortia that may interact with one another and share information. For example, a fraud repository may communicate with another fraud repository. In some embodiments, information gathered from an online business may be shared between one or more fraud repositories, which may subsequently share the information with the other online businesses that they are connected to. In some implementations, the information shared between a first repository and second repository may be stored by both the first and second repositories before being distributed to connected online businesses. Alternatively, a repository may merely pass on information it receives from another repository. The information may be stored or shared in various ways that are known in the art.

For instance, any information stored by a fraud repository may be stored in one or more database of the fraud repository. In one example, the database may have a database table containing pertinent information. However, the data may be stored in different databases and may include different database data structures that are within the scope of this invention. In this example, a database table may include a host column, a unique user-account name, and a user device identifier column that may permit the fraud detection system to associate a particular host (or online business) with a particular user and a particular user device. As described above, the user-account name may represent end-user accounts that are unique to each host. The user device identifiers may represent user devices that have connected to at least one host. The individual rows in the database table may represent unique combinations of host, user-account names and user device identifiers. In some embodiments, each interaction between a device and an account may be tracked. Each interaction may have its own row in the database. Alternatively, interactions between a device and account may be aggregated into a single row. A count and/or statistics of interactions between the device and account may be recorded in the database.

The database table may enable the same user connecting to a different online business with the same user device to be tracked and registered in the consortium. A great deal of additional information may be maintained such as last successful login date and time, last unsuccessful login date and time, total successful logins, total unsuccessful logins, which accounts were accessed, what activity was performed using the accounts, what account setting were modified, etc. as well as any relevant personal and non-personal information, to be discussed in greater detail below.

As previously discussed, information may be stored in "pairs," which may refer to any number of data items that may be somehow linked or connected together. A database table, as mentioned previously, may be an implementation of storing data in pairs. In a consortium or multiple consortia, such information may also be shared in "pairs." For example, a particular host may always link together a credit card number and email address. Such information may be stored and shared as a pair. In some embodiments, each host may have uniform pairs of data that may be shared. For instance, all of the hosts within an online consortium may store together a credit card number and an email address. Similarly, any time a credit card number is shared or tracked across a consortium, an email address may also be shared and tracked with the corresponding credit card number. In another example, a device identifier may be paired with account access and/or activity. In another embodiment of the invention, different hosts may have different pairs of data that are shared (e.g., one host may always pair an email address with a username, and another host may always pair an email address with a credit card number). Any of the data items or types, including device identifiers, or other items discussed herein, may be paired.

When data is stored and tracked as a pair, fraud detection and validation may be improved. For example, if a pair of identifying data is stored, and then the same pair appears again, the device or individual can be identified with greater certainty as the same device or individual. Thus, consortia members may be able to share pairs of information to track a device or user, and/or interactions between a device and an account or other activity.

Based on gathered information, and any information generated by processing the gathered information, such as a device identifier, to be described in more detail, the likelihood of fraud being committed by a particular user with the user computer A1 may be determined and an appropriate action can be taken. Assuming the user computer A1 is granted access to the network, the user computer performs its electronic transaction. If a fraudulent activity occurs during that electronic transaction, that information may also be conveyed to the fraud repository and may be stored by the fraud repository. Alternatively, if fraudulent activity occurs, the information may be conveyed to the other online businesses. In this manner, the one or more online businesses may share fraud information between each other selectively so that a fraud committed against one online business, i.e. online business A, can be logged into and tracked by the fraud repository in accordance with the invention. Alternatively, information about fraudulent activity can be tracked by the consortium of online businesses without analysis by a fraud repository. Thus, a user or user computer that has committed fraudulent activities can be tracked even when the user or user device logs into a different online business, i.e. online business B. Therefore, the fraudulent activities of a user or user computer can be tracked across the consortium.

In some instances, the fraud event may occur and/or be detected while a device is accessing an account and/or a network. In some instances, a fraud event may occur or be detected after the devices accesses the account and/or network. The fraud event may occur online or offline. The device may be identified as having been associated with the fraud event. The behavioral profile of the device may be analyzed to determine the likelihood that the device was involved in the fraud event. Behavioral profiles may be provided to the fraud repository. The fraud repository may make a determination of the likelihood of the device's involvement in the fraud activity based on the collected information. Alternatively, online businesses and/or networks may share the behavioral profile information with one another. Each online business and/or network may optionally make its own determination of whether a device was involved in fraud.

If the device was determined to have been involved in fraud, such information may be shared with all the online businesses of the consortium. The fraud repository may share the information with the various online businesses/networks. Alternatively, the online businesses/networks may share information of fraud perpetrator devices directly with one another.

Similarly, once a fraud perpetrator device has been identified, potential victims may be identified. Information about potential victims may be collected and/or analyzed at a fraud repository. The fraud repository may prioritize and/or determine a response for the potential individual victims and/or victim circles. The fraud repository may suggest courses of actions for the containment and/or prevention of fraud. The online businesses may choose whether to follow such suggestions or not. Alternatively, the online businesses may be required to follow the suggestions. In other embodiments, the online businesses may share potential victim information without requiring a centralized priority and/or response. Each online business may determine its own prioritization and/or course of action in dealing with the fraud threat. The online businesses may or may not share such prioritization and/or courses of action with one another.

Some implementations of using a fraud repository in a consortium may involve repositories capable of handling various tasks. A fraud repository may be one or more stand-alone computing resource, such as a server computer, with a database or storage system, although the functions of the fraud repository and the information storage may be distributed in any number of ways, such as in examples described previously. The fraud repository may include one or more processors, one or more persistent storage devices and a memory. The fraud repository may further include a database server/manager that may store the data in accordance with the invention. The structure and operation of the processor, persistent storage device and memory may be any computing device structure as known in the art. The memory may store a server operating system, and one or more administrator module that are executed by the processor to implement the fraud detection and prevention.

An administrator module may permit an administrator to interact with an online business. For example, an administrator may determine the threshold for enabling a user to interact with the online business if the user may be at risk for fraud. An administrator may also determining a response plan if fraud is detected. In some instances, the response plan may include the prioritization of victims and/or devices that will be addressed. The response plan may include monitoring access and/or activity, or cutting off access and/or certain activity. An administrator may also configure items of the system, adjust query items and update items. An administrator module may also process the data stored or received by the repository, such as to generate a device identifier. An administrator module may enable an administrator to generate a query of, given a particular user device, what users have used that network device or a query that asks, given a particular user, what network devices have been used by the particular user. The administrator may also configure a query that asks, given a particular user device, what other online businesses set this network device to associate users/computers a predetermined number of levels deep or given a particular user, what is that user's current status in the system. An administrator module may perform additional administrative functions such as generating reports from the fraud detection and prevention system and its database.

In some embodiments, hosts, such as online organizations or networks, may be able to individually control their interactions with selected user devices. For example, hosts may set up any number of device and user status levels, and establish any number of behavior patterns/profiles, each of which might require a different action, such as notify a particular email address, page a particular number, deny access to the network, monitor certain actions on or using the account, deny certain actions on or using the account, allow access but change the status of the device, etc. The hosts may also carry out different actions to only certain groups of user devices or on a per device basis. In some cases, each host can establish its own customized rules for every aspect of the present validation method. Because of this, the same circumstances that result in denied access for an end-user for one host may not result in denied access for another host. Such actions may be provided to monitor fraud potential and/or provide fraud containment. Some actions may be provided to help identify fraud perpetrator devices and/or potential fraud victims. One or more device may be tracked to find additional associated fraud perpetrator devices, such as accomplices. Access to one or more high-risk victim account may be cut off to provide fraud containment.

Alternatively, a fraud repository may control a host's interaction with a user device. For example, a fraud repository may determine whether a user device is at risk for fraud and may deny the user device access to the consortium. In some cases, the fraud repository's determination for fraud risk may be uniform for all hosts. Denial of access of the device may prevent the device from being used for future fraudulent activities and may assist with fraud containment. Other preferable embodiments of the invention may allow hosts, or third parties designated by the host(s), to deny access to only certain devices such as risky or untrusted devices (which may be considered herein to be devices associated with confirmed or suspected fraudulent activity that exceeds desired or predetermined levels of risk). For example, a bank or financial institution may be under attack and implement a limited or targeted block of untrusted devices while simultaneously allowing transactions associated with trusted devices to continue uninterrupted. This type of surgical blocking against untrusted devices (or all devices other than trusted devices) would avoid having to place a total hold on all devices thereby allowing banking to continue as usual for vast majority of its customers using trusted devices. By establishing a targeted or surgical block of only some devices, the bank would not be required to shut its door completely or decline access to all devices trying to enter accounts. For some implementations, the bank could designate a third party to issue instructions for such surgical locks on behalf of the bank. Accordingly, fraud containment can be achieved without entirely disrupting all interactions between a host and all user devices.

Identifying information may be used for other applications in addition to fraud detection and prevention or network security. For example, gathered information may relate to a user rating, which may or may not relate to fraud. Such information can be shared across one or more online businesses in a consortium, to track the user or user computer across the consortium. In another example, gathered identity information may have applications in national security and law enforcement.

The information gathered in accordance with the invention may be customized for different user device types. For example, with a personal computer that connects to an online business, the information gathered may include an IP address or browser ID and additional personal or non-personal information to identify the user device. With a cellular phone, it is typically possible to extract data from the cellular phone, such as its serial number, so that only non-personal information may be used to identify the cellular phone network device. For a PDA user device, it may be typically possible to put data/information onto the PDA only so that the certain parameters only may be used to identify the PDA. Thus, depending on the user device, different information may be gathered. In accordance with the invention, information may also be gathered from a hardware device, such as a smart card or PCMCIA card, which may have its own unique identifier that may be used to uniquely identify the card. Thus, information gathering in accordance with the invention may be implemented in a variety of different manners.

A user device's information, which may include risk for fraudulent activity, may be shared with various hosts at various times or manners. Similarly, account information, which may also include risk of fraudulent activity being perpetrated on or though the account, may be shared with various hosts at various times or manners. For example, transaction information (which may include device information and/or account information) may be shared with all hosts whenever a transaction occurs. In another example, transaction information may be shared with all the hosts at particular times, i.e. updating each host every ten minutes, or whatever time an individual host may wish to be updated. Alternatively, transaction information may be provided to a host upon request by the host. For instance, if the information is stored with a fraud repository, a host may choose to automatically update and access repository information whenever a transaction occurs between the host and a user device. In some cases, individual hosts may be able to determine when or how they receive or send shared information. In other cases, information sharing may be uniform across a consortium.

For any of the systems and methods described herein, a consortium may operate taglessly. One or more consortia may be tagless and/or may not require a program to be downloaded to a user device. In some examples, an online host and/or fraud repository may collect information about a user or user device without the use of cookies, text parcels, or programs sent from a server to a client computer. A fraud detection consortium may be able to detect fraud without downloading a fraud detection program to a user device. Rather, a consortium may operate taglessly by collecting information from a user device without requiring a user device to receive any cookies, text parcels, or programs, or download additional applications from any of the hosts or repositories of the consortium. For example, instead of "pushing" an application or tag onto a user device, a consortium may enable data to be "pulled" or extracted from the user device.

In some embodiments, a method for uniformly describing event types and reporting sources so that intelligence from multiple areas and organizations can be interpreted and processed consistently. This may be beneficial for providing information across single networks or combined networks. This may incorporate one or more consortium that may share information useful for the detection and/or containment of fraud.

FIG. 8 shows a plurality of devices capable of communicating with a fraud containment server or system over a network, in accordance with the invention. The plurality of devices 800a, 800b, 800c may communicate with a server 804 over a network 802. It shall be understood that one or more servers can be selected to run each subsystem or the entire fraud containment system (see FIG. 1).

The devices 800a, 800b, 800c as shown may be network devices used in accordance with any of the concepts of the invention illustrated herein for fraud containment. Network devices may include computers whether they be a personal computer, server computer, or laptop computer; mobile devices, such as a tablet, personal digital assistants (PDAs) such as a Palm-based device or Windows CE device; smartphones (e.g., iPhone, BlackBerry, Android, Treo); a wireless email device or other device capable of communicating over landlines or wirelessly with a computer network or other communication network; or any other type of network device that may communicate over a network and handle electronic transactions. The devices may be the same type of device and/or may include different types of devices. For example, the devices may be a computer 800a, a smartphone 800b, and/or a tablet 800c. Alternatively, the devices may all of the same kind or a heterogeneous system with different types of devices.

The devices as shown may belong to customers or individuals interacting with any kind of entity described herein including banks, online businesses merchants, etc. For example, the devices may belong to one or more senders or recipients. Devices may belong to one or more customers of an entity. An entity may be an organization, association, company, partnership, employer, or any other entity. In some embodiments, the entity may be a bank, financial institution, merchant, health care provider, or any other entity that may benefit from providing communications to customers.

The devices 800a, 800b, 800c may communicate with a web server 804. The communication between a network device and a web server may be, for example, a connection between a client computer and a website server over a network 802. It shall be understood that the web server 804 shown may conceptually represent one or more servers that may communicate with one or more computers or other network devices across a network. For example, a plurality of devices may communicate with a single server, or with a plurality of servers as part of a fraud containment system 804. Any description herein of a server may apply to a single server or a plurality of servers. Any description herein of a server may apply to a cloud computing type infrastructure. Cloud computing may include provisioning of dynamically scalable and/or virtualized resources. One or more resources (e.g., memory, processors) may be distributed over one or a plurality of machines.

The network 802, for example, can include a private network, such as a LAN, or interconnections to the online organizations over a communications network, such as the Internet or World Wide Web or any other network that is capable of communicating digital data, such as a wireless, cellular, data transfer, or telecommunications network. Each computer or other network device may connect to one or more web server over the network using data protocols, such as HTTP, HTTPS and the like. In one example, a workflow engine may reside on a computer separate from a web/application server that is on the same LAN as the web/application server.

A customer may interact with a mobile device (e.g., tablet, smartphone) or other network device that may be part of or connected to the fraud containment system. When a computer or other network device is communicating with the web server, the device may have a processor 806 and a memory 808 that may store an operating system (OS) and a browser application or other application to facilitate communications with the web server to carry out any aspect of the invention described herein. For example, the operating system may operate to display a graphical user interface to the user and permit the user to execute other computer programs, such as the browser application. The browser application, such as Microsoft Internet Explorer, Mozilla Firefox, Safari, when executed by the processor, permits the user to access the World Wide Web as is well known. Similarly, other applications or "apps" on mobile devices may be used.

In some embodiments, the server may be owned and/or run by a bank or designated entity. In some instances, the server may be owned and/or run by a third party that may communicate with the bank and/or any other entities described elsewhere herein.

The devices and/or server may include one or more processor and/or memory. The processor may be capable of executing one or more steps to detect and/or contain fraud with recipient devices in accordance with the invention herein.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A computer-implemented method for device identification in a fraudulent electronic transaction, the computer-implemented method comprising:
   by one or more processors:
      accessing an electronic repository storing at least: a plurality of data records corresponding to a plurality of device identifiers, a plurality of account identifiers, and a plurality of relationship indicators, each of the plurality of relationship indicators associated with one more relationships among one or more of the plurality of device identifiers and one or more of the plurality of account identifiers;
      receiving an electronic information data packet associated with an electronic fraudulent transaction and including a fraud event indicator;
      parsing the electronic information data packet to identify a first fraud device identifier used to carry out the electronic fraudulent transaction, the first fraud device identifier corresponding to one of the plurality of device identifiers stored in the electronic repository;
      executing an automated search of the electronic repository using one or more of the plurality of relationship indicators to identify: (a) a first set of device identifiers of the plurality of device identifiers, the first set of device identifiers potentially related to the electronic fraudulent transaction, and (b) a first set of account identifiers of the plurality of account identifiers, the first set of account identifiers potentially related to the electronic fraudulent transaction;
      calculating a first plurality of proximity indicators each associated with each of the first set of device identifiers, each of the first plurality of proximity indicators indicating a number of device identifiers or account identifiers between a device and the first fraud device identifier, the device flagged as a master perpetrator device if the proximity indicator is zero such that the device is used to access an account for committing the electronic fraudulent transaction;
      generating a first plurality of assessment indicators based on the first plurality of proximity indicators and involvement factor rules, each of the first plurality of assessment indicators representing a first confidence level that the device is involved with a perpetrator associated with the electronic fraudulent transaction;
      identifying a subset of the first set of device identifiers based at least on the first plurality of assessment indicators;
      generating one or more electronic flags indicating that the subset of the first set of device identifiers are likely involved with the perpetrator associated with the electronic fraudulent transaction; and
      generating a risk score for a victim circle the risk score representing a second confidence level that one or more potential victim accounts are compromised.

2. The computer-implemented method of claim 1, wherein the electronic information data packet associated with the fraud event comprises information for at least one of: time of the electronic fraudulent transaction, or devices active at or around the time of the electronic fraudulent transaction.

3. The computer-implemented method of claim 1, wherein the victim circle comprises the one or more potential victims accounts associated with the master perpetrator device, the one or more potential victim accounts sharing at least one similar characteristic.

4. The computer-implemented method of claim 3, the victim circle comprises one or more accounts accessed from the master perpetrator device.

5. The computer-implemented method of claim 3, wherein the second confidence level that the one or more potential victim accounts are compromised is determined based on at least one of: behavior patterns exhibited by the master perpetrator device, or activities taken by the one or more potential victim accounts which deviate from normal activities of the one or more potential victim accounts.

6. The computer-implemented method of claim 1, wherein the subset of the first set of device identifiers represents recipients of a benefit of the electronic fraudulent transaction.

7. A system for device identification in a fraudulent electronic transaction, the system comprising:
- a web server for comprising one or more processors configured to execute at least a portion of a fraud containment system;
- a memory for storing computer instructions of the fraud containment system, the computer instructions, when executed, causing the one or more processors of the web server to:
  - access an electronic repository storing at least: a plurality of data records corresponding to a plurality of device identifiers, a plurality of account identifiers, and a plurality of relationship indicators, each of the plurality of relationship indicators associated with one more relationships among one or more of the plurality of device identifiers and one or more of the plurality of account identifiers;
  - receive an electronic information data packet associated with an electronic fraudulent transaction and including a fraud event indicator;
  - parse the electronic information data packet to identify a first fraud device identifier used to carry out the electronic fraudulent transaction, the first fraud device identifier corresponding to one of the plurality of device identifiers stored in the electronic repository;
  - execute an automated search of the electronic repository using one or more of the plurality of relationship indicators to identify: (a) a first set of device identifiers of the plurality of device identifiers, the first set of device identifiers potentially related to the electronic fraudulent transaction, and (b) a first set of account identifiers of the plurality of account identifiers, the first set of account identifiers potentially related to the electronic fraudulent transaction;
  - calculate a first plurality of proximity indicators each associated with each of the first set of device identifiers, each of the first plurality of proximity indicators indicating a number of device identifiers or account identifiers between a device and the first fraud device identifier, the device flagged as a master perpetrator device if the proximity indicator is zero such that the device is used to access an account for committing the electronic fraudulent transaction;
  - generate a first plurality of assessment indicators based on the first plurality of proximity indicators and involvement factor rules, each of the first plurality of assessment indicators representing a first confidence level that the device is involved with a perpetrator associated with the electronic fraudulent transaction;
  - identify a subset of the first set of device identifiers based at least on the first plurality of assessment indicators;
  - generate one or more electronic flags indicating that the subset of the first set of device identifiers are likely involved with the perpetrator associated with the electronic fraudulent transaction; and
  - generate a risk score for a victim circle the risk score representing a second confidence level that one or more potential victim accounts are compromised.

8. The system of claim 7, wherein the electronic information data packet associated with the electronic fraudulent transaction comprises information for at least one of: time of the electronic fraudulent transaction, or devices active at or around the time of the electronic fraudulent transaction.

9. The system of claim 7, wherein the victim circle comprises the one or more potential victim accounts associated with the master perpetrator device, the one or more potential victim accounts shares at least one similar characteristic.

10. The system of claim 9, the victim circle comprises one or more accounts accessed from the master perpetrator device.

11. The system of claim 9, wherein the second third confidence level that the one or more potential victim accounts are compromised is determined based on at least one of: behavior patterns exhibited by the master perpetrator device, or activities taken by the one or more potential victim accounts which deviate from normal activities of the one or more potential victim accounts.

12. The system of claim 7, wherein the subset of the first set of device identifiers represents recipients of a benefit of the electronic fraudulent transaction.

13. Non-transitory computer readable medium having stored thereon a computer program for device identification in a fraudulent electronic transaction, the computer program including executable instructions that instruct a computer system to at least:
- access an electronic repository storing at least: a plurality of data records corresponding to a plurality of device identifiers, a plurality of account identifiers, and a plurality of relationship indicators, each relationship indicator associated with one more relationships among one or more of the plurality of device identifiers and one or more of the plurality of account identifiers;
- receive an electronic information data packet associated with an electronic fraudulent transaction and including a fraud event indicator;
- parse the electronic information data packet to identify a first fraud device identifier used to carry out the electronic fraudulent transaction, the first fraud device identifier corresponding to one of the plurality of device identifiers stored in the electronic repository;
- execute an automated search of the electronic repository using one or more of the plurality of relationship indicators to identify: (a) a first set of device identifiers of the plurality of device identifiers, the first set of device identifiers potentially related to the electronic fraudulent transaction, and (b) a first set of account identifiers of the plurality of account identifiers, the first set of account identifiers potentially related to the electronic fraudulent transaction;
- calculate a first plurality of proximity indicators each associated with each of the first set of device identifiers, each of the first plurality of proximity indicators indicating a number of device identifiers or account identifiers between a device and the first fraud device identifier, the device flagged as a master perpetrator device if the proximity indicator is zero such that the device is used to access an account for committing the electronic fraudulent transaction;
- generate a first plurality of assessment indicators based on the first plurality of proximity indicators and involvement factor rules, each of the first plurality of assessment indicators representing a first confidence level that the device is involved with a perpetrator associated with the electronic fraudulent transaction;
- identify a subset of the first set of device identifiers based at least on the first plurality of assessment indicators;
- generate one or more electronic flags indicating that the subset of the first set of device identifiers are likely involved with the perpetrator associated with the electronic fraudulent transaction; and generate a risk score for a victim circle the risk score representing a second confidence level that one or more potential victim accounts are compromised.

14. The non-transitory computer readable medium of claim 13, wherein the electronic information data packet associated with the electronic fraudulent transaction comprises information for at least one of: time of the fraudulent transaction, or devices active at or around the time of the fraudulent transaction.

15. The non-transitory computer readable medium of claim 13, wherein the victim circle comprises the one or more potential victim accounts associated with the master perpetrator device, the one or more potential victim accounts sharing at least one similar characteristic.

16. The non-transitory computer readable medium of claim 15, the victim circle comprises one or more accounts accessed from the master perpetrator device.

17. The non-transitory computer readable medium of claim 15, wherein the second confidence level that the one or more potential victim accounts are compromised is determined based on at least one of: behavior patterns exhibited by the master perpetrator device, or activities taken by the one or more potential victim accounts which deviate from normal activities of the one or more potential victim accounts.

* * * * *